United States Patent
Allan

(10) Patent No.: US 10,673,742 B2
(45) Date of Patent: Jun. 2, 2020

(54) MULTICAST STATE REDUCTION VIA TUNNELING IN A ROUTED SYSTEM

(71) Applicant: Telefonaktiebolaget L M Ericsson (publ), Stockholm (SE)

(72) Inventor: David Ian Allan, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 117 days.

(21) Appl. No.: 14/850,787

(22) Filed: Sep. 10, 2015

(65) Prior Publication Data
US 2017/0078188 A1    Mar. 16, 2017

(51) Int. Cl.
*H04L 12/761* (2013.01)
*H04L 12/18* (2006.01)
(Continued)

(52) U.S. Cl.
CPC .............. *H04L 45/16* (2013.01); *H04L 12/18* (2013.01); *H04L 12/185* (2013.01);
(Continued)

(58) Field of Classification Search
CPC ......... H04L 45/16; H04L 45/02; H04L 45/12; H04L 12/4633
See application file for complete search history.

(56) References Cited

U.S. PATENT DOCUMENTS 6,778,531 B1   8/2004   Kodialam et al.
6,798,739 B1   9/2004   Lee
(Continued)

FOREIGN PATENT DOCUMENTS

CN    102142970 B    12/2013
EP    2940938 A1    11/2015
(Continued)

OTHER PUBLICATIONS

Li, Xiao-yong, Gui Xiao-lin "Merging Source and Shared Tress Multicast in MPLS Networks", Dec. 1, 2006, pp. 23-28; XP031031665 (Year: 2006).*

(Continued)

*Primary Examiner* — Andrew Lai
*Assistant Examiner* — Chuong M Nguyen
(74) *Attorney, Agent, or Firm* — Sage Patent Group

(57) ABSTRACT

A method is implemented by a network device in a network including a plurality of network devices. The method implements multicast forwarding configuration resulting in reduced state for the network by utilizing unicast tunneling between a root, replication points and leaves that implement each multicast distribution tree. The method selects a multicast group to determine forwarding configuration for the selected multicast group, prunes a shortest path tree for the selected multicast group to generate a source group tree, and determines whether the network device is a root or a replication node for the source group tree. The method further checks whether a downstream leaf or replicating node is adjacent to the network device, and where the selected branch does not have an adjacent replication node or leaf, identifies the next replicating node or leaf on the selected branch, and configures the network device to forward multicast group traffic using a unicast tunnel.

20 Claims, 10 Drawing Sheets

(51) Int. Cl.
*H04L 12/58* (2006.01)
*H04L 12/46* (2006.01)
*H04L 12/753* (2013.01)
*H04L 12/751* (2013.01)
*H04L 12/721* (2013.01)

(52) U.S. Cl.
CPC .......... *H04L 12/4633* (2013.01); *H04L 51/24* (2013.01); *H04L 45/02* (2013.01); *H04L 45/12* (2013.01); *H04L 45/48* (2013.01)

(56) References Cited

U.S. PATENT DOCUMENTS

| | | | |
|---|---|---|---|
| 6,857,012 B2* | 2/2005 | Sim | H04L 47/125 709/222 |
| 7,310,335 B1 | 12/2007 | Garcia-Luna-Aceves et al. | |
| 7,830,787 B1* | 11/2010 | Wijnands | H04L 12/18 370/218 |
| 8,005,081 B2 | 8/2011 | Bragg et al. | |
| 8,121,056 B1* | 2/2012 | Aggarwal | H04L 12/18 370/256 |
| 8,223,668 B2 | 7/2012 | Allan et al. | |
| 8,307,422 B2* | 11/2012 | Varadhan | H04L 12/4633 713/151 |
| 8,310,957 B1* | 11/2012 | Rekhter | H04L 12/4641 370/256 |
| 8,488,603 B2* | 7/2013 | Zha | H04L 12/18 370/390 |
| 8,611,359 B1 | 12/2013 | Kompella et al. | |
| 8,811,388 B2 | 8/2014 | Fedyk | |
| 8,867,367 B2 | 10/2014 | Allan et al. | |
| 8,953,590 B1 | 2/2015 | Aggarwal et al. | |
| 9,112,848 B2 | 8/2015 | Allan et al. | |
| 9,430,262 B1* | 8/2016 | Felstaine | G06F 9/45558 |
| 9,794,148 B1 | 10/2017 | Ramachandran et al. | |
| 9,954,765 B2 | 4/2018 | Allan | |
| 10,069,639 B2* | 9/2018 | Bragg | H04L 12/18 |
| 10,164,907 B2 | 12/2018 | Allan | |
| 2003/0085931 A1 | 5/2003 | Card et al. | |
| 2003/0176931 A1 | 9/2003 | Pednault et al. | |
| 2006/0221867 A1 | 10/2006 | Wijnands et al. | |
| 2006/0268871 A1 | 11/2006 | Van Zijst | |
| 2007/0133568 A1 | 6/2007 | Qing et al. | |
| 2007/0140107 A1* | 6/2007 | Eckert | H04L 12/18 370/216 |
| 2007/0147372 A1 | 6/2007 | Liu et al. | |
| 2007/0171851 A1 | 7/2007 | Beckmann | |
| 2007/0189193 A1* | 8/2007 | Previdi | H04L 12/1868 370/256 |
| 2008/0144644 A1 | 6/2008 | Allan et al. | |
| 2008/0279101 A1 | 11/2008 | Wu et al. | |
| 2008/0298360 A1* | 12/2008 | Wijnands | H04L 12/18 370/389 |
| 2009/0201803 A1* | 8/2009 | Filsfils | H04L 12/185 370/222 |
| 2009/0310538 A1 | 12/2009 | Lee et al. | |
| 2010/0020797 A1 | 1/2010 | Casey et al. | |
| 2010/0281106 A1 | 11/2010 | Ashwood-Smith | |
| 2010/0316056 A1 | 12/2010 | Unbehagen | |
| 2011/0170403 A1 | 7/2011 | Ashwood-Smith et al. | |
| 2011/0202761 A1 | 8/2011 | Sarela et al. | |
| 2011/0228780 A1 | 9/2011 | Ashwood-Smith et al. | |
| 2011/0273980 A1 | 11/2011 | Ashwood Smith | |
| 2011/0299427 A1 | 12/2011 | Chu et al. | |
| 2011/0305239 A1* | 12/2011 | Chandrashekharachar Suvarneshwar | H04L 12/185 370/390 |
| 2012/0063451 A1 | 3/2012 | Keesara et al. | |
| 2012/0063465 A1 | 3/2012 | Keesara et al. | |
| 2012/0075988 A1* | 3/2012 | Lu | H04L 45/02 370/218 |
| 2012/0106347 A1 | 5/2012 | Allan et al. | |
| 2012/0147885 A1* | 6/2012 | Johri | H04L 12/1854 370/390 |
| 2012/0177041 A1 | 7/2012 | Berman | |
| 2012/0177042 A1 | 7/2012 | Berman | |
| 2012/0177043 A1 | 7/2012 | Berman | |
| 2012/0201539 A1 | 8/2012 | Boertjes et al. | |
| 2012/0233350 A1 | 9/2012 | Unbehagen et al. | |
| 2012/0300774 A1* | 11/2012 | Casey | H04L 12/462 370/390 |
| 2013/0010790 A1* | 1/2013 | Shao | H04L 45/16 370/390 |
| 2013/0114466 A1* | 5/2013 | Koponen | H04L 41/0893 370/255 |
| 2013/0114595 A1 | 5/2013 | Mack-Crane et al. | |
| 2013/0142511 A1 | 6/2013 | Spraggs et al. | |
| 2013/0195111 A1 | 8/2013 | Allan et al. | |
| 2013/0259046 A1 | 10/2013 | Ramesh | |
| 2014/0036913 A1 | 2/2014 | Olofsson et al. | |
| 2014/0064063 A1 | 3/2014 | Holness et al. | |
| 2014/0086097 A1 | 3/2014 | Qu et al. | |
| 2014/0092898 A1 | 4/2014 | Berman | |
| 2014/0112188 A1 | 4/2014 | Keesara et al. | |
| 2014/0126422 A1 | 5/2014 | Bragg | |
| 2014/0211797 A1 | 7/2014 | Luo et al. | |
| 2014/0241351 A1 | 8/2014 | Kollipara et al. | |
| 2014/0241352 A1 | 8/2014 | Kollipara et al. | |
| 2014/0254592 A1 | 9/2014 | Olofsson et al. | |
| 2014/0376366 A1 | 12/2014 | Li et al. | |
| 2015/0156106 A1 | 6/2015 | Allan | |
| 2015/0188771 A1 | 7/2015 | Allan et al. | |
| 2015/0319007 A1 | 11/2015 | Allan et al. | |
| 2015/0358226 A1 | 12/2015 | Liu | |
| 2016/0028625 A1 | 1/2016 | Hari et al. | |
| 2016/0277291 A1 | 9/2016 | Lakshmikanthan et al. | |
| 2016/0308793 A1 | 10/2016 | Levy-Abegnoli et al. | |
| 2017/0012880 A1 | 1/2017 | Yang | |
| 2017/0078188 A1 | 3/2017 | Allan | |
| 2017/0093612 A1 | 3/2017 | Singh et al. | |
| 2017/0093689 A1 | 3/2017 | Manur et al. | |
| 2018/0324090 A1* | 11/2018 | Duncan | H04L 45/50 |
| 2019/0020598 A1 | 1/2019 | Allan | |
| 2019/0116053 A1 | 4/2019 | Allan | |

FOREIGN PATENT DOCUMENTS

| | | |
|---|---|---|
| WO | 2014139564 A1 | 9/2014 |
| WO | 2017118941 A1 | 7/2017 |
| WO | 2017144943 A1 | 8/2017 |
| WO | 2017144944 A1 | 8/2017 |
| WO | 2017144945 A1 | 8/2017 |
| WO | 2017144946 A1 | 8/2017 |
| WO | 2017144947 A1 | 8/2017 |
| WO | 2017168203 A1 | 10/2017 |
| WO | 2017168204 A1 | 10/2017 |

OTHER PUBLICATIONS

IEEE Std 802.1Qca/D2.1: "Draft Standard for Local and Metropolitan Area Networks—Bridges and Bridged Networks—Amendment: Path Control and Reservation," IEEE Computer Society, Jun. 23, 2015, 114 pages.

Farkas, et al., "IS-IS Path Computation and Reservation, draft-ieff-isis-pcr-02," Internet Engineering Task Force (IETF), IS-IS for IP Internets, Internet-Draft, Sep. 18, 2015, 32 pages.

Kini, et al., "Entropy labels for source routed stacked tunnels, draft-ietf-mpls-spring-entropy-label-00," Internet Engineering Task Force (IETF), Network Working Group, Internet-Draft, Mar. 5, 2015, 12 pages.

Bhaskar, et al., "Bootstrap Router (BSR) Mechanism for Protocol Independent Multicast (PIM), rfc5059.txt," 5. JCT-VC Meeting; 96. MPEG Meeting; Mar. 16, 2011-Mar. 23, 2011; Geneva; (Joint Collaboartive Team on Video Coding of ISO/IEC JTC1/SC29/WG11 and ITU-T SG.16); URL: http://wftp3.itu.int/av-arch/jctvc-site, Internet Engineering Task Force, IETF, Ch, Jan. 1, 2008 (Jan. 1, 2008), XP015055131, ISSN: 0000-0003, Complete chapter "1. Introduction"; p. 3-p. 8.

Cheng D., et al., "IGP Multicast Architecture," draft-yong-pim-igp-multicast-arch-01, IETF, Mar. 9, 2015, pp. 1-15.

(56) References Cited

OTHER PUBLICATIONS

Filsfils C., et al.,"Segment Routing Architecture," draft-ietf-spring-segment-routing-07.txt, IETF, ISOC, Dec. 15, 2015, pp. 1-24.
Hao W., et al., "IGP Multicast Architecture," draft-yong-rtgwg-igp-multicast-arch-01.txt, IETF, ISOC, Nov. 2014, pp. 1-14.
Li et al.,"Merging Source and Shared Trees Multicast in MPLS Networks," PDCAT, Seventh International Conference, Dec. 1, 2006, pp. 23-28.
Previdi S., et al.,"SPRING Problem Statement and Requirements," draft-ietf-spring-problem-statement-07.txt, IETF, ISOC, Mar. 1, 2016, pp. 1-18.
IEEE Std 802.1aq-2012: "IEEE Standard for Local and Metropolitan Area Networks—Media Access Control (MAC) Bridges and Virtual Bridged Local Area Networks—Amendment 20: Shortest Path Bridging," IEEE Computer Society, Jun. 29, 2012, 340 pages.
RFC 5036: Andersson, et al., "LDP Specification," Network Working Group, Request for Comments: 5036, Oct. 2007, 135 pages.
RFC 6388: Wijnands, et al. "Label Distribution Protocol Extensions for Point-to-Multipoint and Multipoint-to-Multipoint Label Switched Paths," Internet Engineering Task Force (IETF), Request for Comments: 6388, Nov. 2011, 39 pages.
Filsfils, et al., "Segment Routing with MPLS data plane, draft-ietf-spring-segment-routing-mpls-01," Network Working Group, Internet-Draft, May 29, 2015, 14 pages.
U.S. Appl. No. 13/594,076, Notice of Allowance, dated Jun. 18, 2014, 9 pages.
U.S. Appl. No. 14/493,150, Non-Final Office Action, dated Jan. 23, 2015, 5 pages.
U.S. Appl. No. 14/493,150, Notice of Allowance, dated Apr. 15, 2015, 6 pages.
U.S. Appl. No. 14/800,279, Non-Final Office Action, dated Oct. 26, 2015, 6 pages.
Aggarwal, et al. "BGP MPLS Based Ethernet VPN, draft-raggarwa-sajassi-l2vpn-evpn-04.txt", Internet Engineering Task Force (IETF), Network Working Group, Internet-Draft, Sep. 12, 2011, 43 pages.
Allan, et al., "Shortest Path Bridging, MAC Mode Support over EVPN, draft-ietf-bess-spbm-evpn-02," Internet Engineering Task Force (IETF), BESS Working Group, Internet-Draft, Oct. 2015, 11 pages.
Dalal, et al., "Reverse Path Forwarding of Broadcast Packets," Communications of the ACM, Dec. 1978, vol. 21, No. 12, pp. 1040-1048.
Filsfils, et al., "Interconnecting Millions of Endpoints With Segment Routing, draft-filsfils-spring-large-scale-interconnect-00," Internet Engineering Task Force (IETF), IETF Trust, Network Working Group, Internet-Draft, Jul. 19, 2015, 10 pages.
Filsfils, et al., "Segment Routing with MPLS data plane, draft-ietf-spring-segment-routing-mpls-02," Network Working Group, Internet-Draft, Oct. 17, 2015, 14 pages.
IEEE P802.1aq/D4.6, Draft Standard for Local and Metropolitan Area Networks—"Media Access Control (MAC) Bridges and Virtual Bridged Local Area Networks—Amendment XX: Shortest Path Bridging", Feb. 10, 2012, 363 pages.
RFC 3031: Rosen, et al., "Multiprotocol Label Switching Architecture," The Internet Society, Network Working Group, Request for Comments: 3031, Jan. 2001, 61 pages.
RFC 3353: Ooms, et al., "Overview of IP Multicast in a Multi-Protocol Label Switching (MPLS) Environment," The Internet Society, Network Working Group, Request for Comments: 3353, Aug. 2002, 30 pages.
RFC 3813: Srinivasan, et al., "Multiprotocol Label Switching (MPLS) Label Switching Router (LSR) Management Information Base (MIB)," The Internet Society, Network Working Group, Request for Comments: 3813, Jun. 2004, 60 pages.
RFC 4364: Rosen, et al., "BGP/MPLS IP Virtual Private Networks (VPNs)", The Internet Society, Network Working Group, Request for Comments: 4364, Feb. 2006, 47 pages.
RFC 5015: Handley, et al., "Bidirectional Protocol Independent Multicast (BIDIR-PIM)," Network Working Group, Request for Comments: 5015, Oct. 2007, 43 pages.
RFC 6329: Fedyk, et al., "IS-IS Extensions Supporting IEEE 802.1aq Shortest Path Bridging," Internet Engineering Task Force (IETF), Request for Comments: 6329, Apr. 2012, 38 pages.
RFC 6514: Aggarwal, et al., "BGP Encodings and Procedures for Multicast in MPLS/BGP IP VPNs," Internet Engineering Task Force (IETF), Request for Comments: 6514, IETF Trust, Feb. 2012, 59 pages.
RFC 6826: Wijnands, et al., "Multipoint LDP In-Band Signaling for Point-to-Multipoint and Multipoint-to-Multipoint Label Switched Paths," Internet Engineering Task Force (IETF), Request for Comments: 6826, Jan. 2013, 12 pages.
RFC 7734: Allan, et al., "Support for Shortest Path Bridging MAC Mode over Ethernet VPN (EVPN)," Internet Engineering Task Force (IETF), Request for Comments: 7734, IETF Trust, Jan. 2016, 11 pages.
Sajassi, et al., "PBB E-VPN, draft-sajassi-l2vpn-pbb-evpn-03.txt," Internet Engineering Task Force (IETF), Network Working Group, Internet-Draft, Oct. 28, 2011, 25 pages.
Boudani et al., "An Effective Solution for Multicast Scalability: The MPLS Multicast Tree (MMT)—draft-boudani-mpls-multicast-tree-06.txt," Internet Draft, Oct. 2004, 21 pages.
Rabadan, et al., "Usage and applicability of BGP MPLS based Ethernet VPN—draft-ietf-bess-evpn-usage-01.txt," Internet Engineering Task Force (IETF), Internet Society, Jul. 4, 2015, 30 pages.
RFC 3209: Awduche, et al., "RSVP-TE: Extensions to RSVP for LSP Tunnels," Network Working Group, The Internet Society, Request for Comments: 3209, Dec. 2001, 61 pages.
Allen, et al., "A Framework for Computed Multicast applied to MPLS based Segment: draft-allan-spring-mplsmulticast-framework-OO.txt," SPRING Working Group, Feb. 23, 2016, pp. 1-13.
Allan, et al., "802.1aq and 802.1Qbp Support over EVPN; draft-allan-12vpn-spbm-evpn-00.txt," IETF, Standard Working Draft, ISOC, Jul. 9, 2012, pp. 1-11.
Aggarwal, et al., "BGP MPLS Based Ethernet VPN, draft-ietf-12vpn-evpn-00," IETF Network Working Group Internet Draft, Feb. 24, 2012, pp. 1-39.
Allan, et al., "A Framework for Computed Multicast applied to MPLS based Segment Routing; draft-allan-spring-mpls-multicast-framework-00," SPRING Working Group, IETF, Feb. 23, 2016, pp. 1-13.
Filsfils, et al., "Interconnecting Millions of Endpoints With Segment Routing, draft-filsfils-spring-large-scale-interconnect-01," Internet Engineering Task Force (IETF), IETF Trust, Network Working Group, Internet-Draft, Nov. 1, 2015, 11 pages.
IEEE Std 802.1ad-2005: "IEEE Standard for Local and Metropolitan Area Networks—Virtual Bridged Local Area Networks—Amendment 4: Provider Bridges," IEEE Computer Society, May 26, 2006, pp. 1-74.
IEEE Std 802.1ah-2008: "IEEE Standard for Local and metropolitan area networks—Virtual Bridged Local Area Networks; Amendment 7: Provider Backbone Bridges," IEEE Computer Society, Aug. 14, 2008, pp. 1-121.
Sajassi, et.al., "PBB E-VPN; draft-ieff-12vpn-pbb-evpn-02," IETF Trust, Internet Working Group, Internet Draft, Mar. 29, 2012, pp. 1-27.
Singh, D., "Yet another blog about Segment Routing—Part 1," Packet Pushers Interactive, LLC, Blog, Apr. 27, 2015, pp. 1-11.
Wikipedia, "Multiprotocol Label Switching," Nov. 6, 2017, pp. 1-7.
Wikipedia, "Tunneling protocol," Apr. 28, 2018, pp. 1-4.
Wikipedia, "Unicast," Sep. 11, 2017, 2 pages.
Yong, et al., "IGP Multicast Architecture; draft-yong-pim-igp-multicast-arch-01.txt," IGP Multicast Architecture, IETF, Mar. 9, 2015, pp. 1-15.
Yong, et al., "IGP Multicast Architecture; draft-yong-rtgwg-igp-multicast-arch-01.txt," IETF, Nov. 10, 2014, pp. 5-8.

* cited by examiner

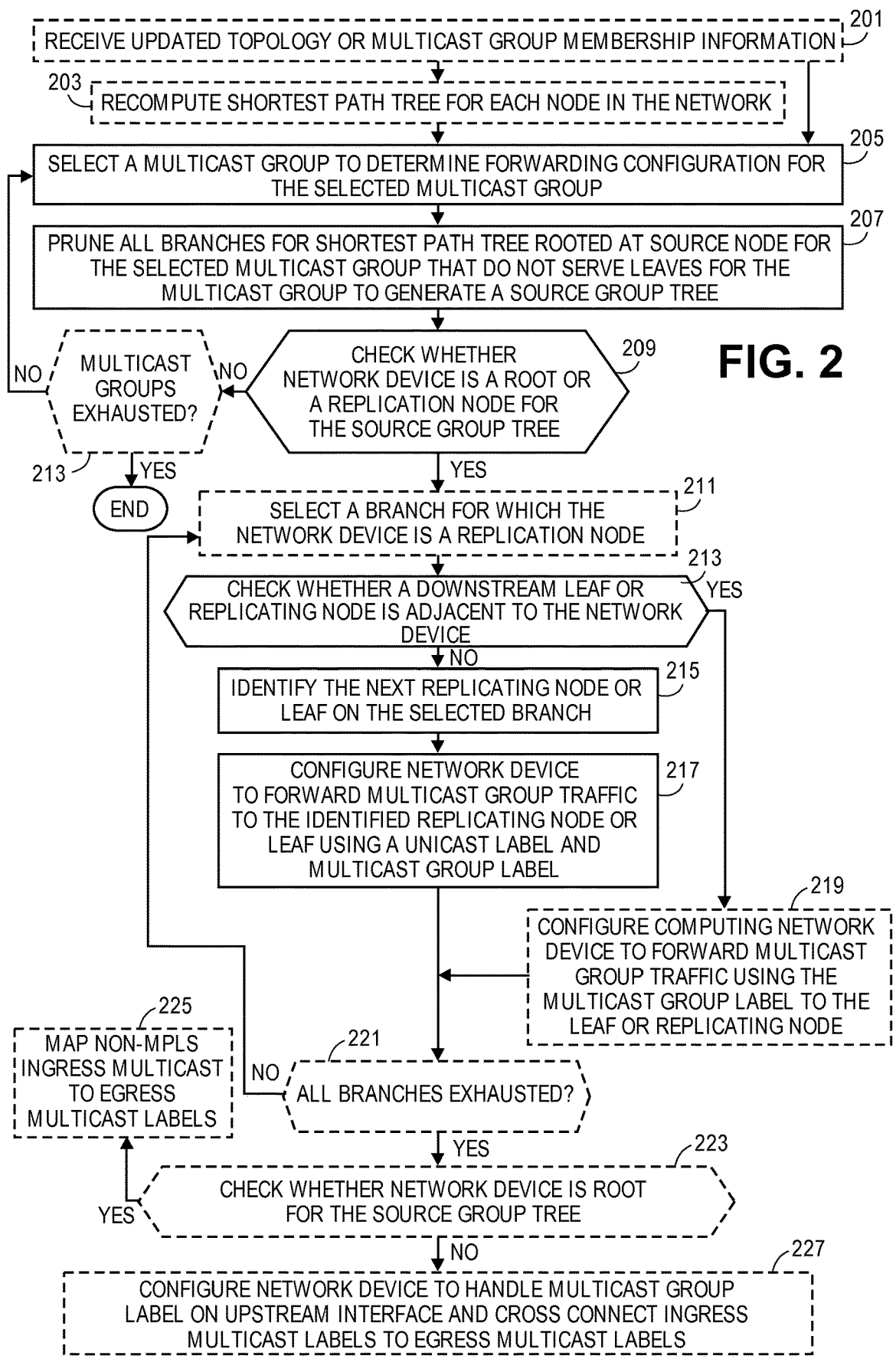

FIG. 4A
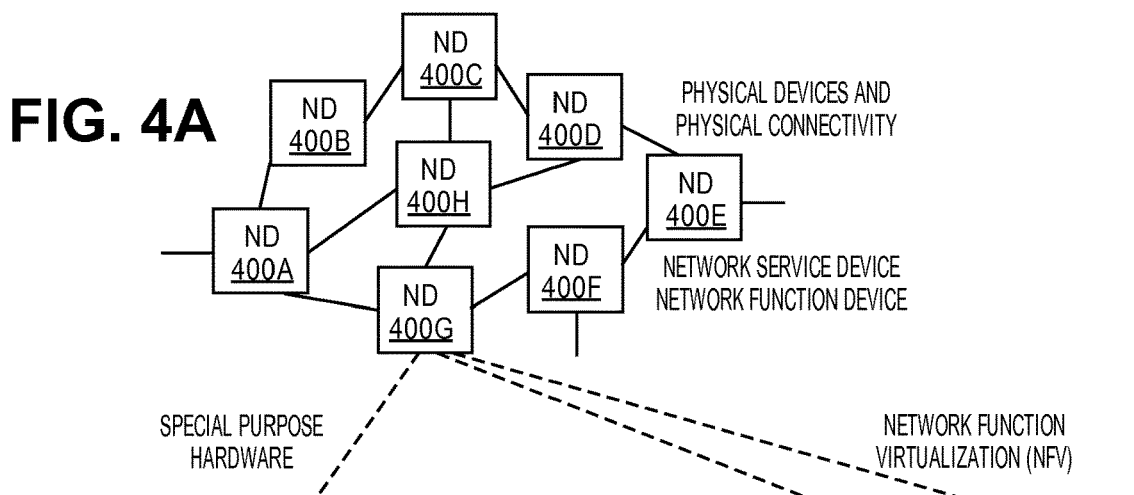
PHYSICAL DEVICES AND PHYSICAL CONNECTIVITY
NETWORK SERVICE DEVICE
NETWORK FUNCTION DEVICE
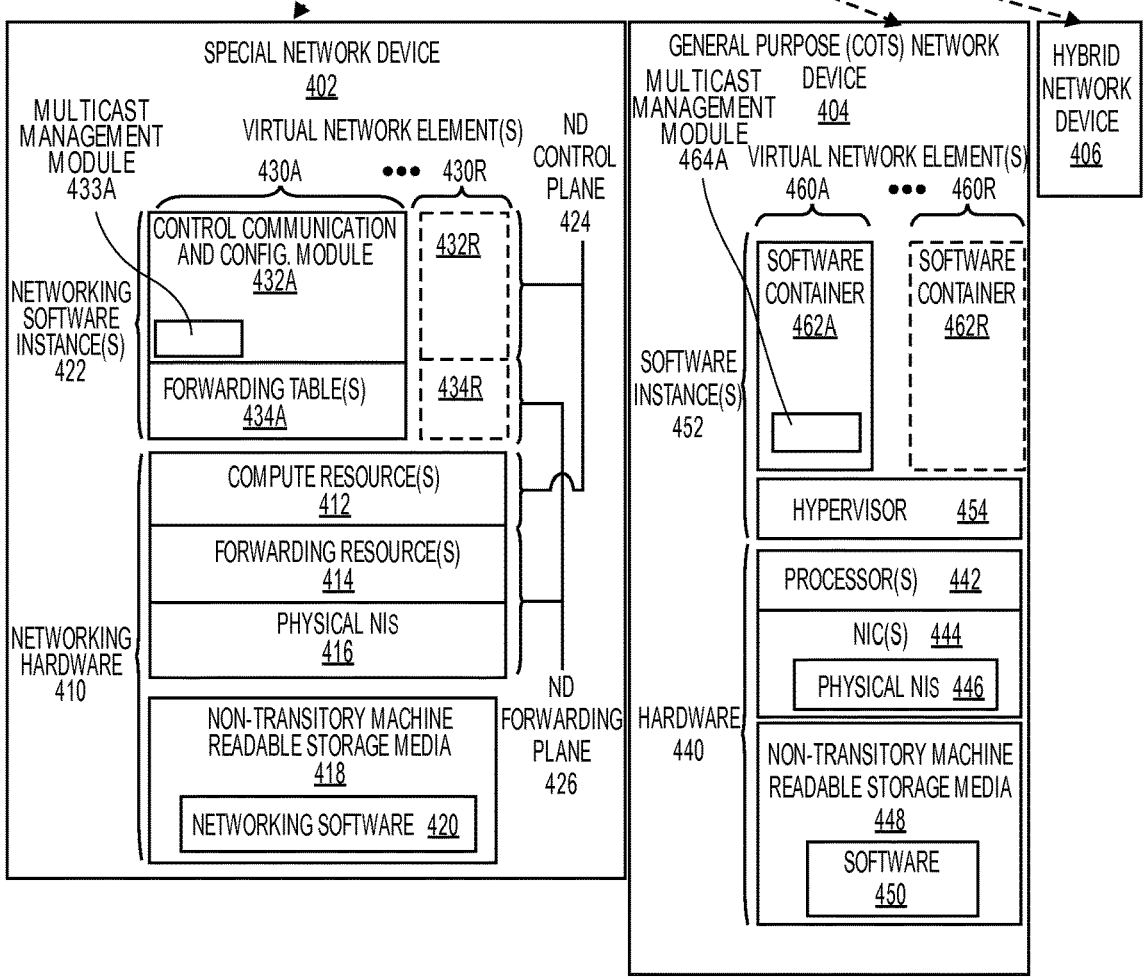
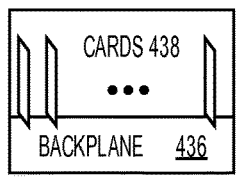
FIG. 4B

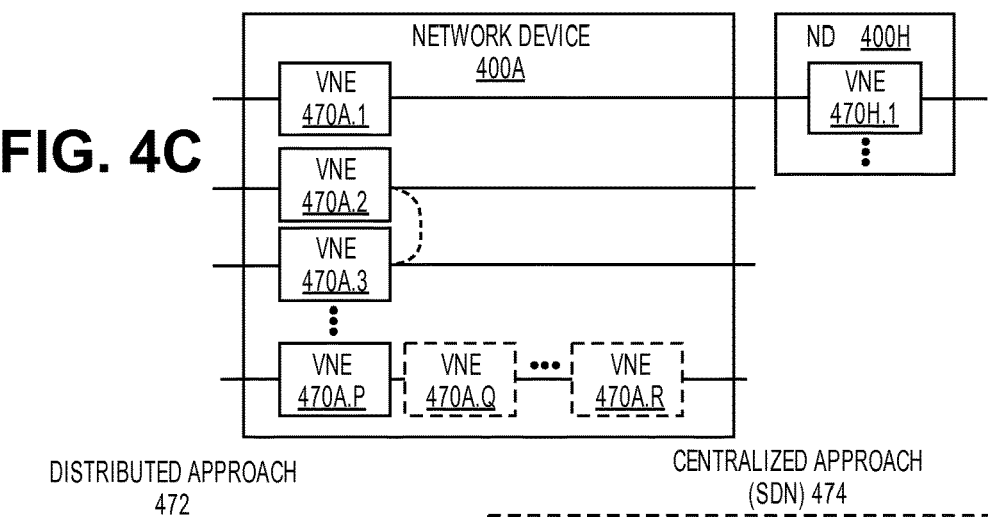
FIG. 4C
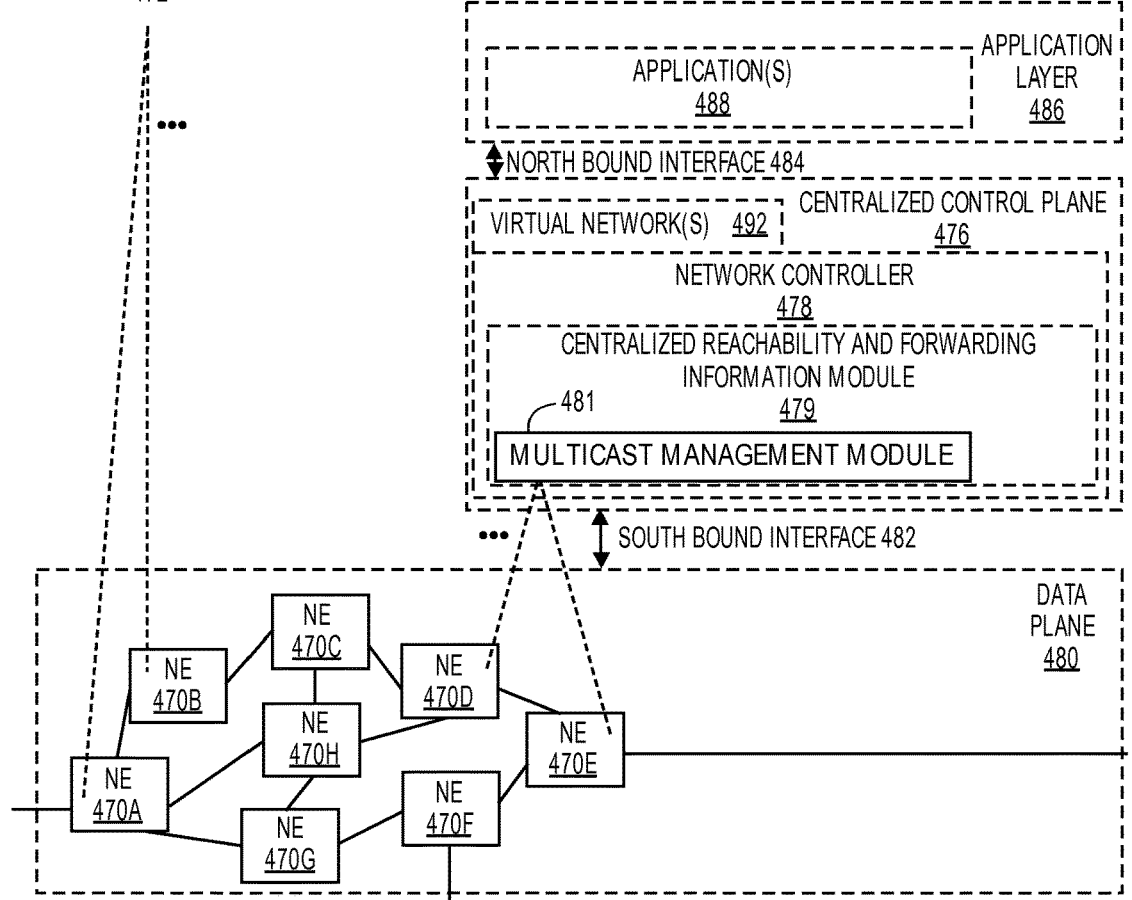
FIG. 4D
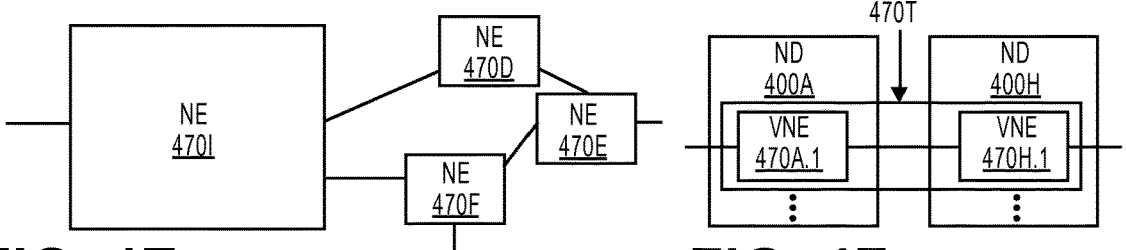
FIG. 4E
FIG. 4F

MULTICAST STATE REDUCTION VIA TUNNELING IN A ROUTED SYSTEM

FIELD

Embodiments of the invention relate to the field of multicast routing. In particular, the embodiments relate to a process for improving efficiency of multicast routing by reducing state via the use of tunnels between replication points in multicast distribution trees.

BACKGROUND

Numerous techniques and protocols exist for configuring networks to handle multicast traffic. For Internet Protocol (IP) and/or multiprotocol label switching (MPLS) implementations the existing solutions for multicast are based on multicast label distribution protocol (mLDP) or protocol independent multicast (PIM). These are all techniques that depend on a unicast shortest path first (SPF) computation followed by handshaking between peers to sort out a loop free multicast distribution tree (MDT) for each multicast source. At the same time numerous protocols exist that provide for unicast tunneling, and some (such as label based architectures like SPRING or MPLS-LDP implement a full mesh of unicast tunnels as an artifact for normal operation).

SPB is a protocol related to computer networking for the configuration of computer networks that enables multipath routing. In one embodiment, the protocol is specified by the Institute of Electrical and Electronics Engineers (IEEE) 802.1aq standard. This protocol replaces prior standards such as spanning tree protocols. SPB enables all paths in the computing network to be active with multiple equal costs paths being utilized through load sharing and similar technologies. The standard enables the implementation of logical Ethernet networks in Ethernet infrastructures using a link state protocol to advertise the topology and logical network memberships of the nodes in the network. SPB implements large scale multicast as part of implementing virtualized broadcast domains.

Proposals have been made to use global identifiers in the dataplane combined with the IEEE 802.1 aq technique of advertising multicast registrations in the interior gateway protocol (IGP) and using an "all pairs shortest path" computation to compute MDTs without the additional handshaking.

SPRING is an exemplary profile of the use of MPLS technology whereby global identifiers are used in the form of a global label assigned per label switched route (LSR) used for forwarding to that LSR. A full mesh of unicast tunnels is constructed via every node in the network computing the shortest path to every other node and installing the associated global labels accordingly. In the case of SPRING, this also allows explicit paths to be set up via the application of label stacks at the network ingress. Encompassed with this approach is the concept of a strict (every hop specified) or loose (some waypoints specified) route dependent on how exhaustively the ingress applied label stack specifies the path.

However, the configuration of flat multicast trees in such networks using MPLS, SPB, SPRING and similar technologies can generate a significant amount of state, in particular in association with source specific tree implementation of multicast groups. To implement a given multicast group it is necessary to install state to implement an MDT per source. Less optimal solutions exist such as spanning trees or shared trees, but a tree per source per group provides for efficient multicast delivery. Solutions for multicast also may involve protracted convergence due to handshaking and all involve excessive state in the network. The use of SPB or IEEE 802.1aq techniques permits accelerated convergence but does not address the volume of state problem, in particular in the case of large numbers of sparse multicast trees where the set of receivers for any given MDT is less than the set of network nodes. However, significant state remains to be maintained across the network. Further the use of SPB while providing for multipath between points in the network, cannot take advantage of the statistical improvements to load distribution available via techniques such as equal cost multipath (ECMP).

SUMMARY

In one embodiment, a method implemented by a network device in a network including a plurality of network devices, the method to implement multicast forwarding configuration utilizing a method resulting in reduced state for the network by utilizing unicast tunneling between a root, replication points and leaves that implement each multicast distribution tree. The method selects a multicast group to determine forwarding configuration for the selected multicast group, prunes all branches of a shortest path tree rooted at a source node for the selected multicast group that do not serve at least one leaf for the multicast group to generate a source group tree, and determines whether the network device is a root or a replication node for the source group tree. The method further checks whether a downstream leaf or replicating node is adjacent to the network device, and where the selected branch does not have an adjacent replication node or leaf, identifies the next replicating node or leaf on the selected branch, and configuring the network device to forward multicast group traffic to the identified replicating node or leaf using a unicast tunnel.

A networking device in a network including a plurality of network devices. The networking device to execute a method to implement multicast forwarding configuration utilizing a method resulting in reduced state for the network by utilizing unicast tunneling between a root, replication points and leaves that implement each multicast distribution tree. The network device includes a non-transitory machine-readable storage device having stored therein a multicast management module, and a processor coupled to the non-transitory machine-readable storage device. The processor is configured to execute the multicast management module. The multicast management module is configured to select a multicast group to determine forwarding configuration for the selected multicast group, prune all branches of a shortest path tree rooted at a source node for the selected multicast group that do not serve at least one leaf for the multicast group to generate a source group tree, to determine whether the network device is a root or a replication node for the source group tree, to check whether a downstream leaf or replicating node is adjacent to the network device, and where the selected branch does not have an adjacent replication node or leaf, identifying the next replicating node or leaf on the selected branch, and configuring the network device to forward multicast group traffic to the identified replicating node or leaf using a unicast tunnel.

In one embodiment, a computing device is in communication with a network device in a network with a plurality of network devices. The computing device executes a plurality of virtual machines for implementing network function virtualization (NFV), wherein a virtual machine from the plurality of virtual machines is configured to implement a method to implement multicast forwarding configuration utilizing the method resulting in reduced state for the network by utilizing unicast tunneling between a root, replication points and leaves that implement each multicast distribution tree. The computing device includes a non-transitory machine-readable storage device having stored therein a multicast management module, and a processor coupled to the non-transitory machine-readable storage device. The processor is configured to execute the virtual machine. The virtual machine is configured to execute the multicast management module. The multicast management module is configured to select a multicast group to determine forwarding configuration for the selected multicast group, prune all branches of a shortest path tree rooted at a source node for the selected multicast group that do not serve at least one leaf for the multicast group to generate a source group tree, to determine whether the network device is a root or a replication node for the source group tree, to check whether a downstream leaf or replicating node is adjacent to the network device, and where the selected branch does not have an adjacent replication node or leaf, identifying the next replicating node or leaf on the selected branch, and configuring the network device to forward multicast group traffic to the identified replicating node or leaf using a unicast tunnel.

A control plane device is configured to implement a control plane of a software defined networking (SDN) network including a network device in a network with a plurality of network devices, wherein the control plane device is configured to implement a method to implement multicast forwarding configuration utilizing the method resulting in reduced state for the network by utilizing unicast tunneling between a root, replication points and leaves that implement each multicast distribution tree. The control plane device includes a non-transitory machine-readable storage device having stored therein a multicast management module, and a processor coupled to the non-transitory machine-readable storage device. The processor is configured to execute the multicast management module. The multicast management module is configured to select a multicast group to determine forwarding configuration for the selected multicast group, prune all branches of a shortest path tree rooted at a source node for the selected multicast group that do not serve at least one leaf for the multicast group to generate a source group tree, to determine whether the network device is a root or a replication node for the source group tree, to check whether a downstream leaf or replicating node is adjacent to the network device, and where the selected branch does not have an adjacent replication node or leaf, identifying the next replicating node or leaf on the selected branch, and configuring the network device to forward multicast group traffic to the identified replicating node or leaf using a unicast tunnel.

BRIEF DESCRIPTION OF THE DRAWINGS

The invention may best be understood by referring to the following description and accompanying drawings that are used to illustrate embodiments of the invention. In the drawings:

FIG. 2 is a flowchart of one embodiment of the process for configuring a network using MPLS and SPRING to reduce state for multicast implementations.

FIG. 4A illustrates connectivity between network devices (NDs) within an exemplary network, as well as three exemplary implementations of the NDs, according to some embodiments of the invention.

FIG. 4B illustrates an exemplary way to implement a special-purpose network device according to some embodiments of the invention.

FIG. 4C illustrates various exemplary ways in which virtual network elements (VNEs) may be coupled according to some embodiments of the invention.

FIG. 4D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 4E illustrates the simple case of where each of the NDs implements a single NE, but a centralized control plane has abstracted multiple of the NEs in different NDs into (to represent) a single NE in one of the virtual network(s), according to some embodiments of the invention.

FIG. 4F illustrates a case where multiple VNEs are implemented on different NDs and are coupled to each other, and where a centralized control plane has abstracted these multiple VNEs such that they appear as a single VNE within one of the virtual networks, according to some embodiments of the invention.

DESCRIPTION OF EMBODIMENTS

Figure 1A:
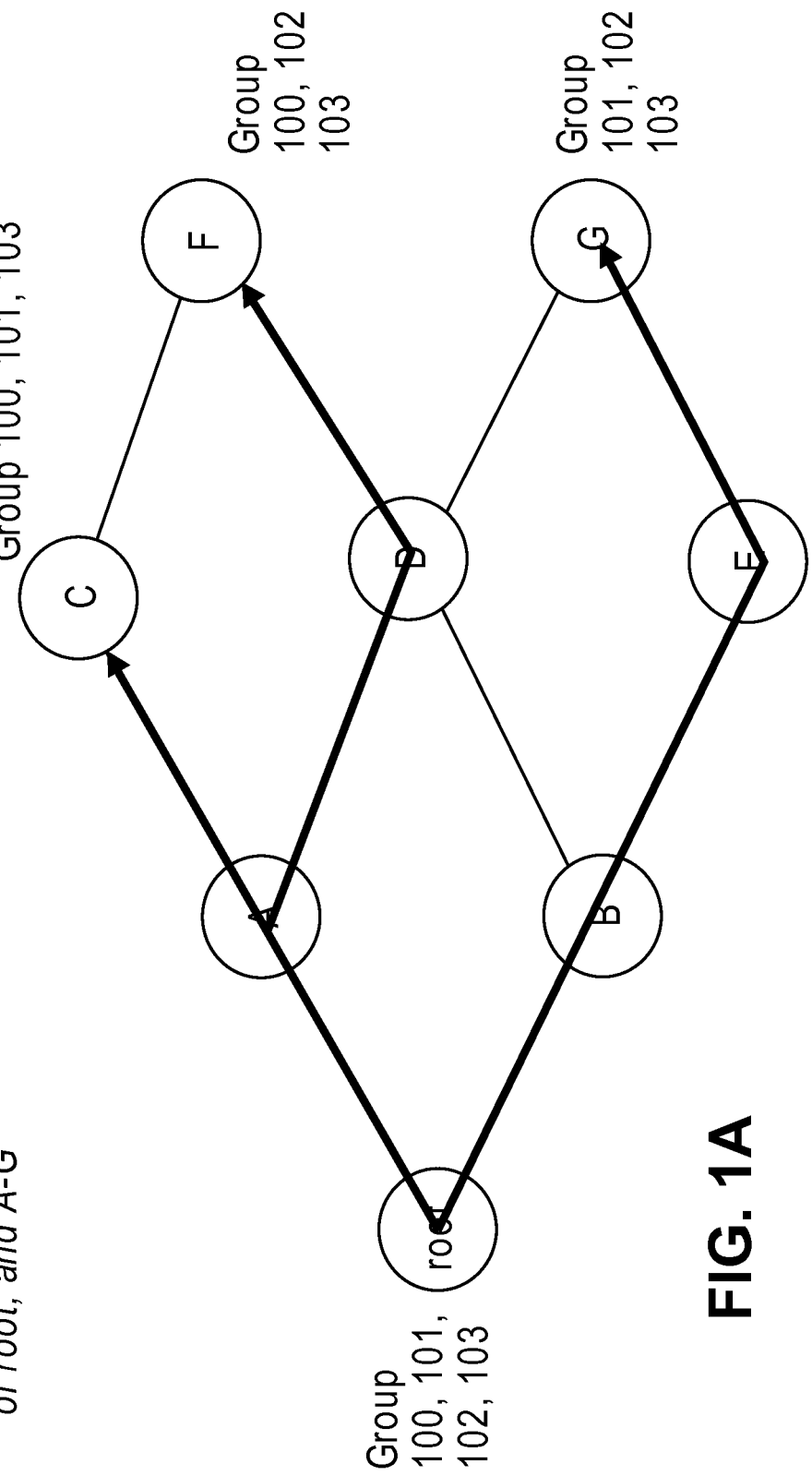
FIGS. 1A-1E are diagrams of one example network topology and associated shortest path first tree and multicast trees for a set of multicast groups.

The following description describes methods and apparatus for improving the efficiency of multicast management in a network. The technique focuses on multicast trees without explicit routes as there are numerous issues with ensuring loop freeness in a tree with some waypoints pinned. The methods and apparatus in the exemplary embodiment utilize multiprotocol label switching (MPLS), algorithms defined as part of the shortest path bridging specification (e.g., IEEE 802.11aq), source packet routing in networking (SPRING) architecture, unicast global labels, unicast tunneling and related technologies to reduce the amount of state that is required to be utilized for implementing multicast across a network. The embodiments provide a process for implementing completely loosely specified (no waypoints) multicast distribution trees (MDT) that takes advantage of the additional information available as a result of the all-pairs computations of MDTs to construct connectivity as a hybrid of roots, replication points, tunnels and leaves to minimize the amount of multicast state required in the network. The exemplary embodiment utilizes global labels for both unicast tunnels and multicast (S,G) MDTs, but one skilled in the art would realize that any global network identifier could be substituted.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Overview

The embodiments provide a method of utilizing unicast tunnels within a network to minimize multicast related state. The embodiments utilize the computations of MDTs and the exemplary information available in SPB implementations such as IEEE 802.1aq adapted to other technologies. In IEEE 802.1 aq multicast registrations are advertised in the interior gateway protocol (IGP), thus all nodes in the network have multicast group membership information about the other nodes in the network.

IEEE 802.1aq permitted the dataplane (S,G) forwarding state to be algorithmically constructed from information received in the control plane. Other technologies such as MPLS or SPRING would overload a single identifier to represent (S,G) such as a single MPLS label. Therefore the information distributed in the control plane would need to be augmented to reflect this. As an example, multicast registrations in a SPRING network would identify both the multicast group and the global label a given root intended to use for the (S,G) MDT.

IEEE 802.1 aq performs an all-pairs shortest path computation that determines a path from all nodes in a network to all other nodes in the network that selects a shortest path to each node from a source node. When combined with the tie breaking algorithms specified in IEEE 802.1aq the result is an acyclic shortest path tree. Multicast distribution trees can also be computed in the same manner as they can be derived from the shortest path trees using the notion of reverse path forwarding. With the use of multicast protocol label switching (MPLS) a global multicast label is assigned by the management system and used on a per (S, G) multicast distribution tree basis. The (S, G) notation indicates an S—source and G—multicast group relation where the multicast tree has a single source and a group of listeners in a network. The multicast labels in the network are carried end to end (E2E). This is inherent to the operation of SPRING. A multicast implementation MPLS could also be envisioned that combined IGP registrations and an LDP signaled unicast tunnel mesh could also be adapted to carry the labels E2E.

The example embodiments utilize SPRING for unicast tunneling. As a consequence of SPRING operation, upon nodal convergence to align with the view of the network available via the IGP, the local forwarding information base (LFIB) of each network device in the network will have at least one SPRING-label switched route to each other LSR. It is not necessary, but assumed that the network will also utilize penultimate-hop popping (PHP) on SPRING based LSPs where the outermost label is removed before being forwarded to the last hop to a destination.

While a network with these characteristics is described herein with relation to the embodiments, one skilled in the art would understand that this description is provided by way of example and not limitation. Other technologies, protocols and architectures can be utilized in place or in combination with those described herein where the other technologies function in a similar manner or with similar purpose.

A system as described herein above including an IEEE 802.1aq implementation with multicast requires a significant amount of state in association with the (S, G) multicast distribution trees. To implement a given multicast group, state must be installed for "S" multicast distribution trees that is an MDT must be maintained for each source node S. As the Ethernet dataplane is effectively flat and does not support the concept of tunnels, every node participating in an MDT must install multicast state.

The embodiments reduce the requisite amount of state by use of unicast tunneling between the replication points identified by computation in a given multicast distribution tree. This requires all nodes in the network to compute an identical solution, a problem solved via IEEE 802.1aq algorithms. A replicating point is a node in the MDT where multicast data traffic is replicated to be transmitted on multiple branches to multiple leaves, or may be what is known as a "bud" node whereby it is both a leaf, and relays traffic to further downstream leaves. Using this system only the replicating points in the MDTs need to install state for the global label that represents each (S, G) MDT.

After a shortest path first (SPF) tree (i.e., an (S, *) tree where S indicates the node is the source and * indicates the tree reaches all nodes) is computed for a given node that node can then determine whether it is a root, a leaf or a replication node for each possible (S, G) MDT. If the node has one of these three roles in a given MDT it will then install the appropriate state for each, whereas if the node does not participate in the MDT in any of the three roles then no state needs to be installed for that MDT. The installed state where the node is a root or a replicating node utilizes established a priori unicast tunnels to deliver multicast packets to downstream non-adjacent leaves or replicating nodes. Tunnels do not need to be established for downstream immediately adjacent nodes that have a role in the MDT as they will have installed state for the MDT. Knowledge of the role of each node in the network in relation to a given MDT is an artifact of the all-pairs shortest path computation.

FIG. 1A is a diagram of an example network topology and the SPF tree that has been calculated for the root node for that topology as well as the group membership information of each of the nodes of the network. In the example embodiment, the network consists of a set of network devices labeled A-G and a 'root' node. The examples provide scenarios where the root node is a multicast source node, however, those skilled in the art would understand that any number of nodes in a network can be source nodes for the network and that the illustrated network topology and configuration is provided by way of illustration and not limitation.

In this example the bold lines represent the all pairs calculated SPF tree (S, *) where the S node is the root node. The same SPF is computed at each of the nodes in the network as part of the distributed IEEE 802.1aq SPF computation or similar process. The nodes in the example network topology include nodes that are a part of four multicast groups where the root node serves as a source node S. The multicast groups have each been given a global label unique to each of the multicast groups, which in this example are labels 100, 101, 102, and 103. Each of the network nodes has been assigned a global unicast label (which in the example will correspond to the node identifying letter for simplicity), which is used by all other nodes for the construction of the shortest path tree to that node. Any number of multicast groups can be supported by this process and any number of nodes in the network can be sources and listeners for these multicast groups. For sake of clarity, the examples provide a single source and a limited number of multicast groups, subscribers and nodes. However, one skilled in the art would understand that the process and structures are applicable to other topologies with any number of multicast groups and nodes.

Figure 1B:
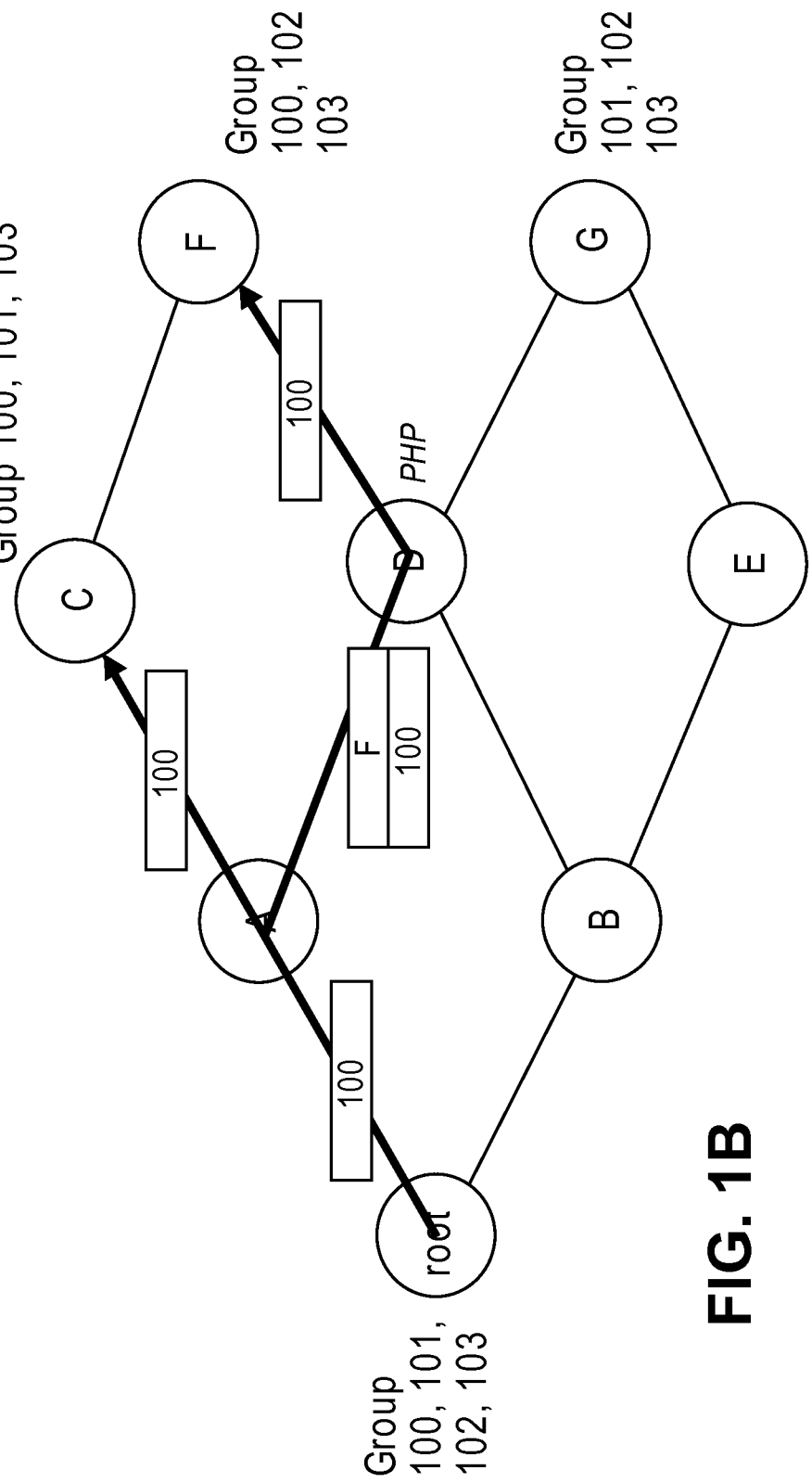

FIG. 1B is a diagram of a multicast distribution tree and configuration for the multicast group with global label 100. In the example embodiment, the MDT services two nodes, node C and node F, which are the only subscribers to this multicast group in the example. The configuration of the nodes in this MDT entails the use of three local forwarding information base (LFIB) entries related to the multicast group labeled 100 across the network. There is one LFIB entry at the root node to send the multicast traffic of group 100 to node A, then there are two LFIB entries at node A to send multicast traffic of group 100 to nodes C and F. Node A is immediately adjacent to both the root and node C, so no state conservation via tunneling is possible and the multicast packet is sent unencapsulated. However, node F is not immediately adjacent to A so the copy of the packet intended for F is tunneled. This saves the network from one extra LFIB entry at node D. Each of these determinations is made at the respective nodes, such that in this example, the root decides to install one LFIB entry, node A determines to install two LFIB entries, and node D determines that no LFIB entries are needed.

This tree is constructed by each node performing independent determination of their role in the MDT. The root sets the LFIB entry to forward multicast data traffic for the multicast group 100 to the immediately adjacent node A using label 100 as the top label. Node A sets label 100 as the top label for the adjacent node C. In contrast, node A sets label F as the top label for the multicast data traffic of the multicast group 100 to forward this data traffic toward node F, where the label F is a tunnel label with node F as the other endpoint. The nodes C and F are aware that they are leaves of the (S, 100) MDT and install state to handle the multicast traffic of multicast group 100. Node D does not install any state due to it not being a leaf or replicating node. Similarly, nodes B, E and G are aware that they are not part of the (S, 100) MDT and install no related state.

Figure 1C:
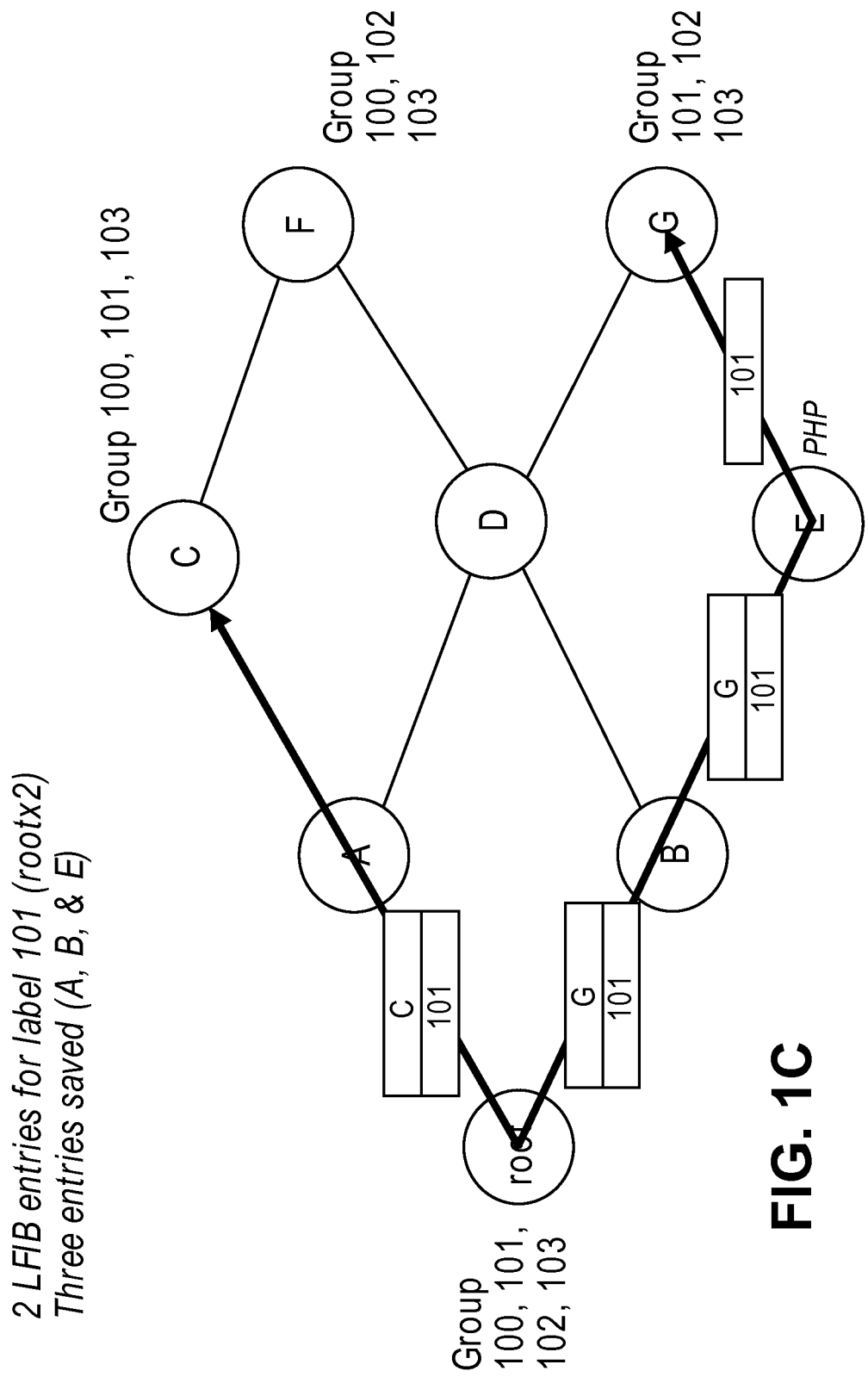

FIG. 1C is a diagram of a multicast distribution tree and configuration for the multicast group with label 101. In the example embodiment, the MDT services two nodes, node C and node G, which are the only subscribers to this multicast group in the example. The configuration of the nodes in the MDT entails the use of two LFIB entries related to the multicast group labeled 101 across the network. There are two LFIB entries at the root to tunnel copies of the multicast traffic group 101 to node C and node G. This saves the network from three entries at node A, node B and node E. As discussed above, each of these determinations of role and required state for each MDT is made at the respective nodes as part of the multicast convergence process.

The root sets the LFIB entry to forward multicast data traffic for the multicast group 101 to the next replication nodes on each branch, namely nodes C and G. The LFIB entries identify labels C and G, respectively to forward multicast data traffic for multicast group 101 to nodes C and G using label 100 as the top label for unicast tunneling to each of these nodes. The nodes C and G are aware that they are leaves of the (S, 101) MDT and install state to handle the multicast traffic of multicast group 101. Nodes A, B, and E do not install any state due to these nodes not being a leaf or replicating node. Similarly, nodes D and F are aware that they are not part of the (S, 101) MDT and install no related state.

Figure 1D:
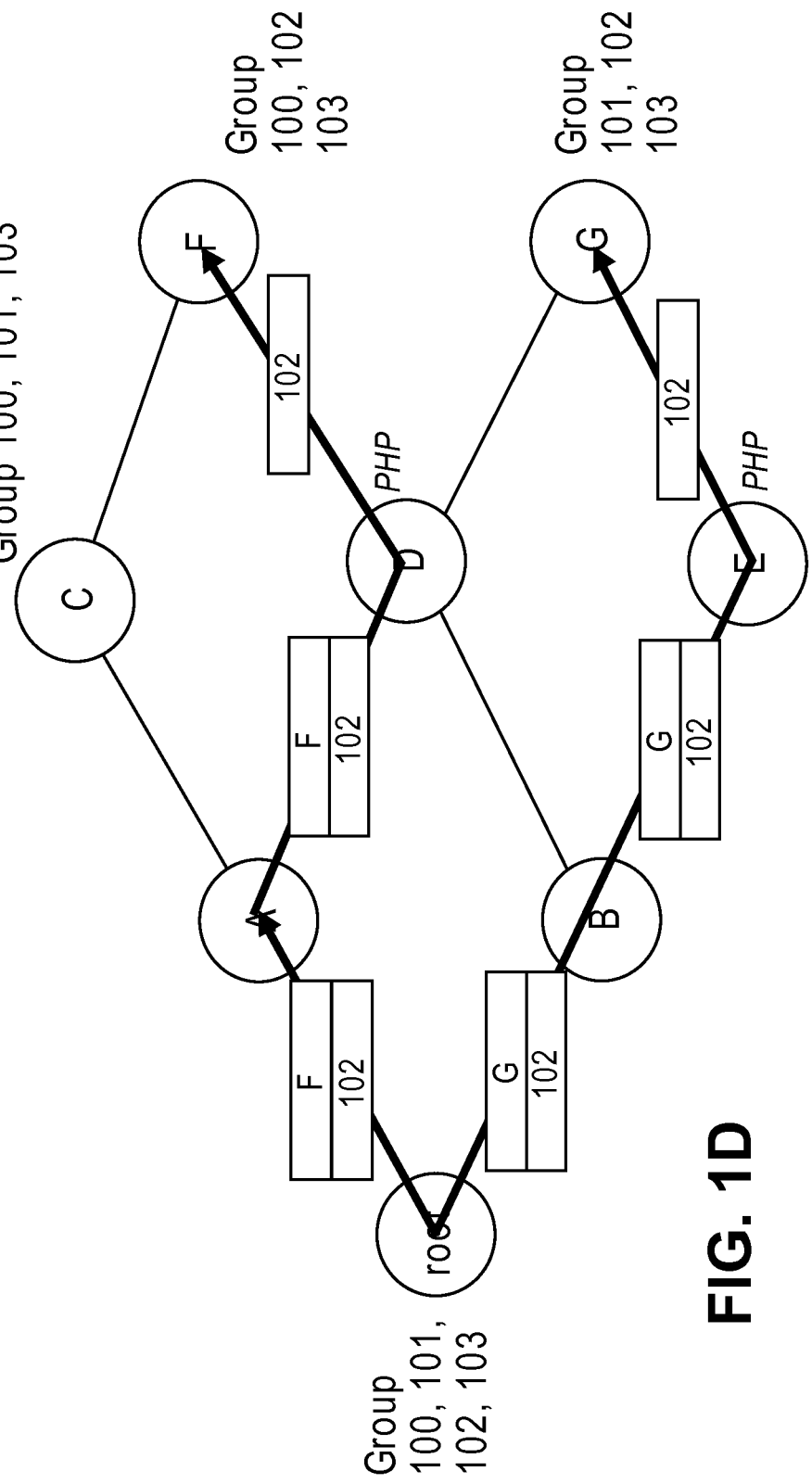

FIG. 1D is a diagram of a multicast distribution tree and configuration for the multicast group with label 102. In the example embodiment, the MDT services two nodes, node F and node G, which are the only subscribers to this multicast group in the example. The configuration of the nodes in this MDT entails the use of two LFIB entries related to the multicast group labeled 102 across the network. There are two LFIB entries at the root node to send the multicast traffic of group 102 to nodes F and G. This saves the network from four extra LFIB entries at nodes A, B, D and E. Each of these determinations is made at the respective nodes, such that in this example, the root decides to install two LFIB entries, and nodes A, B, D, and E determine that no LFIB entries are needed.

The root sets the two LFIB entries to forward multicast data traffic for the multicast group 102 to the nodes F and G using label 102 as the top label. Labels F and G are tunnel labels with node F and G as the other endpoints, respectively. The nodes G and F are aware that they are leaves of the (S, 102) MDT and install state to handle the multicast traffic of multicast group 102. Nodes A, B, D and E do not install any state due to these nodes not being a leaf or replicating node. Similarly, node C is aware that they are not part of the (S, 102) MDT and install no related state.

Figure 1E:
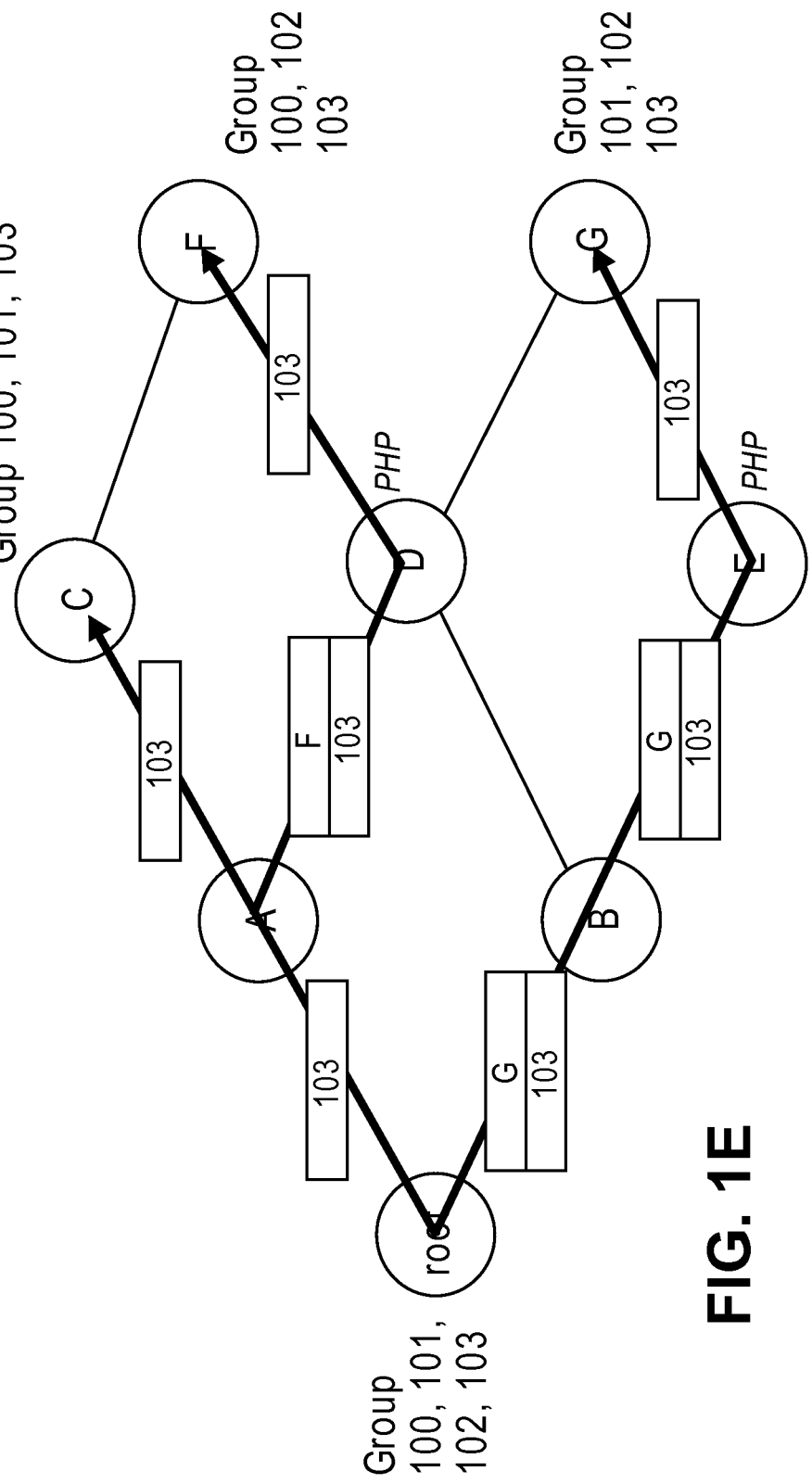

FIG. 1E is a diagram of a multicast distribution tree and configuration for the multicast group with label 103. In the example embodiment, the MDT services three nodes, node C, node F and node G, which are the only subscribers to this multicast group in the example. The configuration of the nodes in this MDT entails the use of four LFIB entries related to the multicast group labeled 103 across the network. There are two LFIB entries at the root node to send the multicast traffic of group 103 to nodes C, F and G. This saves the network from three extra LFIB entries at nodes B, D and E. Each of these determinations is made at the respective nodes, such that in this example, the root decides to install two LFIB entries, node A decides to install two entries, and nodes B, D, and E determine that no LFIB entries are needed.

The root sets the two LFIB entries to forward multicast data traffic for the multicast group 103 to the node G using label 103 as the top label and to adjacent node A with label 103. Label G is a tunnel label with node G as the other endpoint. At node A two LFIB entries are installed with an LFIB entry for C and F. The LFIB entry uses label 103 since C is an adjacent node. The LFIB entry for node F uses label F to tunnel the multicast traffic to node F. The nodes C, G and F are aware that they are leaves of the (S, 103) MDT and install state to handle the multicast traffic of multicast group 103. Nodes B, D and E do not install any state due to these nodes not being a leaf or replicating node.

In these examples, the network is able to significantly reduce the state of the network in terms of LFIB entries. As shown in the table below by way of example, eleven entries can be saved. However in other topologies, greater reductions in the state can be achieved.

TABLE I

| GROUP | LFIB without Reduction | LFIB with Reduction |
|---|---|---|
| 100 | 4 | 3 |
| 101 | 5 | 2 |
| 102 | 6 | 2 |
| 103 | 7 | 4 |
| TOTAL | 22 | 11 |

As mentioned above, the simple example illustrated there is a 50% reduction in the overall state. For more complex network topologies with large numbers of sparse (S, G) MDTs the savings would more significant. The absolute worst case for an MDT with 'n' leaves, is that 2×'n' nodes will need to install state irrespective of network size.

FIG. 2 is a diagram of one embodiment of the process for implementing the state reduction process at each node. This process is executed in response to changes in the topology of the network or changes with the multicast group membership (Block 201). The changes in network topology require a recomputation of the all-pairs SPF tree (Block 203). However, where there is only a change in the group membership the SPF tree for each node does not need to be recomputed. After the recomputation or where such recomputation is not needed, the process can iterate through each of the multicast groups to determine MDTs for each source node. In other embodiments, the process may not be iterative, instead a parallel or similar process can be utilized.

The process selects one of the multicast groups present in the network to be processed (Block 205). The multicast groups can be processed in any order or in parallel as there are not any ordering dependencies in how the computation is performed. An iterative process is described for sake of clarity, but one skilled in the art would understand that other processes are possible consistent with the method and principles described herein. For the selected multicast group, the SPF tree that has been determined for the source (i.e., is rooted at the source node) of the multicast group is pruned (Block 207). That is, the SPF tree provides a route to all nodes in the network, but not all the nodes in the network belong to the selected multicast group. Thus, the branches of the SPF tree that lead only to leaves that are not part of the selected multicast group can be removed to identify a MDT for the selected multicast group referred to here as a source group tree.

A check can then be made whether the network device that is implementing this process is a root or a replication node for the source group tree (Block 209). If the computing network device is not a root or replication node, then a check is made whether additional multicast groups remain to be processed (Block 213). If additional multicast groups remain to be processed, then the process continues by selecting the next multicast group (Block 205). Thus, where the computing node is not a replicating node, no state needs to be installed for that multicast group. This process is implemented by each node in the network as part of a distributed process. Thus, each node in the network arrives at the same understanding of the state of the network and shares the same topology information via the IGP and similar technologies. In turn, each node (i.e. each network device) can determine its own configuration to establish the unicast tunneling that reduces state for the handling of multicast traffic.

If the computing network device is a replication node for the source group tree for the selected multicast group, then multiple branches are present to which the computing network device must forward the multicast traffic of the multicast group that is currently being processed. A branch from this set of branches in the source group tree is selected (Block 211). A check is made whether a leaf or replicating node is adjacent to the computing network device along the selected branch (Block 213). If there is an adjacent leaf or replicating node, then the computing network device configures itself to forward multicast group traffic on this branch using the multicast group label (Block 219). The multicast group label is a global label and known to each of the nodes that is a part of the multicast group. In this case, the tunneling is not utilized and the multicast traffic is configured to be forwarded using the global multicast group label.

If the selected branch does not lead to an adjacent leaf or replicating node, then the next replicating node or leaf on the selected branch is identified (Block 215). The identification of the next leaf or replicating node can be determined by traversing the branch or through similar techniques. Once the leaf or replicating node is identified, then the computing network device is configured to forward multicast group traffic on this branch to the next replicating node or leaf using a unicast label and a multicast group label (Block 217). The unicast label identifies the leaf or replicating node that is next on this branch, which thereby establishes the proximate end of the unicast tunnel.

Whether the branch was configured for an adjacent node or remote destination, the process then checks whether all the branches of the computing network device have been processed (Block 221). If they have not all been exhausted, then the process selects the next branch that has not been processed and reiterates the previous steps (Block 211). However, if the branches have all been processed, then the process checks whether the computing network device is the root for the selected source group tree (Block 223). If the computing network device is the root, then the computing network device is configured to map non-MPLS ingress multicast data traffic to egress multicast group labels (Block 225). For each multicast group that the computing node serves as a source within the given network and where the multicast group traffic originates outside the network, the computing network device is configured to map the multicast group as it is identified at the ingress port of the computing device to the multicast group label that has been configured for the given network.

If the computing network device is not the root, then computing network device is configured to handle multicast group labels on the upstream interface and to cross connect ingress multicast labels to egress multicast labels (Block 227). As each node in the network may be configured as set forth above to forward multicast group data traffic via unicast tunneling to a remote node, the remote nodes must be configured to receive the multicast group data traffic to complete the remote end of the unicast tunnel. Similarly, the ingress multicast labels are cross connected with the egress multicast labels as configured above where there is replication at a given network device.

Example pseudocode describing this process of FIG. 2 is further set forth above for sake of illustration. With this pseudocode several assumptions are made that within the IGP database exists the network topology and that associated with each node is what multicast groups the node is a source for, and the global label it will use along with what multicast groups the node is a leaf for and the global label to be used to reach the node via unicast.

A node (this_node) receives notice of a routing change (topology or group membership change) which triggers computation set forth in the following psuedocode:

```
For each node in the network → termed current_root;
    Compute a shortest path "template" tree for current_root using 802.1aq techniques;
        For each multicast group current_root is a source for;
            prune all branches from template tree that are not leaves → source_group_tree;
                if this_node is a replication node for source_group_tree;
                    for each downstream branch;
                        if leaf or replicating node is immediately adjacent;
                            install global multicast label for (S,G) obtained from IGP as outgoing label in that interface;
                        else
                            determine the next leaf or replication point in the branch by traversing the branch; /* will be one or the other or both */
                                install label stack of unicast label to leaf or next replication point, and (S.G) label, (both obtained from IGP) as the outgoing labels on that interface;
                        endif;
                    endfor;
                    if this_node != current root
                        configure LFIB to understand multicast_label for (S,G) on upstream interfaces
                            cross connect ingress labels to egress labels
                        else
                            map non-MPLS ingress multicast to egress labels
                        endif
                else
                    if node was previously a replication node for source_group_tree remove associated state; /* garbage collect */
                endif;
            current_root = next node;
End for;
```

The operations in the above and other flow diagrams have been described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Architecture

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 3:
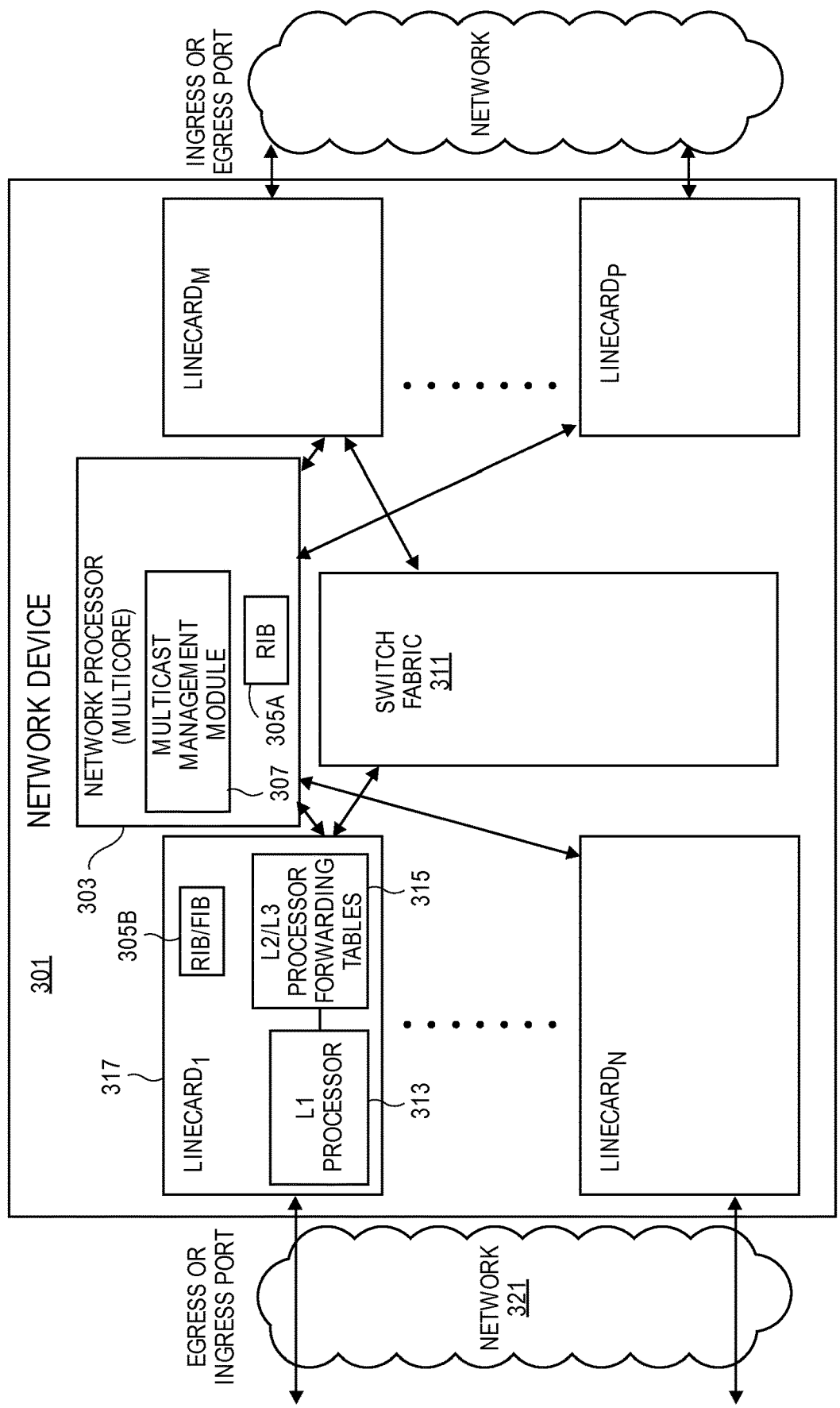
FIG. 3 is a diagram of one embodiment of a network device according to some embodiments of the invention.

FIG. 3 is a diagram of one embodiment of the network device. In one embodiment, the determination and configuration of quick change IP channels is implemented by a network device 301 or similar computing device. The network device 301 can have any structure that enables it to receive data traffic (e.g., multicast data traffic) and forward it toward its destination. The network device 301 can include a network processor 303 or set of network processors that execute the functions of the network device 301. A 'set,' as used herein, is any positive whole number of items including one item. The network device 301 can execute a set of multicast management modules 307 to implement the functions of configuring the network for proper handling of quick change IP channels forwarding of data packets across networks where the network device 301 functions as a node in this network as described herein above via a network processor 303.

The network device 301 connects with separately administered networks that have user equipment and/or content servers. The network processor 303 can implement the multicast management module(s) 307 as a discrete hardware, software module or any combination thereof. The network processor 303 can also service the routing information base 305A and similar functions related to data traffic forwarding and network topology maintenance. The routing information base 305A can be implemented as match action tables that are utilized for forwarding protocol data units PDUs (i.e. packets). The functions of the multicast management module(s) 307 can be implemented as modules in any combination of software, including firmware, and hardware within the network device. The functions of the multicast management module(s) 307 that are executed and implemented by the network device 301 include those described further herein above.

In one embodiment, the network device 301 can include a set of line cards 317 that process and forward the incoming data traffic toward the respective destination nodes by identifying the destination and forwarding the data traffic to the appropriate line card 317 having an egress port that leads to or toward the destination via a next hop. These line cards 317 can also implement the forwarding information base and/label forwarding base 305B, or a relevant subset thereof. The line cards 317 can also implement or facilitate the multicast management module(s) 307 functions described herein above. The line cards 317 are in communication with one another via a switch fabric 311 and communicate with other nodes over attached networks 321 using Ethernet, fiber optic or similar communication links and media.

FIG. 4A illustrates connectivity between network devices (NDs) within an exemplary network, as well as three exemplary implementations of the NDs, according to some embodiments of the invention. FIG. 4A shows NDs 400A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 400A, E, and F illustrates that these NDs act as ingress and egress points for the network (and thus, these NDs are sometimes referred to as edge NDs; while the other NDs may be called core NDs).

Two of the exemplary ND implementations in FIG. 4A are: 1) a special-purpose network device 402 that uses custom application-specific integrated-circuits (ASICs) and a proprietary operating system (OS); and 2) a general purpose network device 404 that uses common off-the-shelf (COTS) processors and a standard OS.

The special-purpose network device 402 includes networking hardware 410 comprising compute resource(s) 412 (which typically include a set of one or more processors), forwarding resource(s) 414 (which typically include one or more ASICs and/or network processors), and physical network interfaces (NIs) 416 (sometimes called physical ports), as well as non-transitory machine readable storage media 418 having stored therein networking software 420. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 400A-H. During operation, the networking software 420 may be executed by the networking hardware 410 to instantiate a set of one or more networking software instance(s) 422. Each of the networking software instance(s) 422, and that part of the networking hardware 410 that executes that network software instance (be it hardware dedicated to that networking software instance and/or time slices of hardware temporally shared by that networking software instance with others of the networking software instance(s) 422), form a separate virtual network element 430A-R. Each of the virtual network element(s) (VNEs) 430A-R includes a control communication and configuration module 432A-R (sometimes referred to as a local control module or control communication module) and forwarding table(s) 434A-R, such that a given virtual network element (e.g., 430A) includes the control communication and configuration module (e.g., 432A), a set of one or more forwarding table(s) (e.g., 434A), and that portion of the networking hardware 410 that executes the virtual network element (e.g., 430A).

Software 420 can include code which when executed by networking hardware 410, causes networking hardware 410 to perform operations of one or more embodiments of the present invention as part networking software instances 422. This includes the multicast management module 433A and related software that performs the processes and implements the structure described herein above.

The special-purpose network device 402 is often physically and/or logically considered to include: 1) a ND control plane 424 (sometimes referred to as a control plane) comprising the compute resource(s) 412 that execute the control communication and configuration module(s) 432A-R; and 2) a ND forwarding plane 426 (sometimes referred to as a forwarding plane, a data plane, or a media plane) comprising the forwarding resource(s) 414 that utilize the forwarding table(s) 434A-R and the physical NIs 416. By way of example, where the ND is a router (or is implementing routing functionality), the ND control plane 424 (the compute resource(s) 412 executing the control communication and configuration module(s) 432A-R) is typically responsible for participating in controlling how data (e.g., packets) is to be routed (e.g., the next hop for the data and the outgoing physical NI for that data) and storing that routing information in the forwarding table(s) 434A-R, and the ND forwarding plane 426 is responsible for receiving that data on the physical NIs 416 and forwarding that data out the appropriate ones of the physical NIs 416 based on the forwarding table(s) 434A-R.

FIG. 4B illustrates an exemplary way to implement the special-purpose network device 402 according to some embodiments of the invention. FIG. 4B shows a special-purpose network device including cards 438 (typically hot pluggable). While in some embodiments the cards 438 are of two types (one or more that operate as the ND forwarding plane 426 (sometimes called line cards), and one or more that operate to implement the ND control plane 424 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/ Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 436 (e.g., a first full mesh coupling the line cards and a second full mesh coupling all of the cards).

Returning to FIG. 4A, the general purpose network device 404 includes hardware 440 comprising a set of one or more processor(s) 442 (which are often COTS processors) and network interface controller(s) 444 (NICs; also known as network interface cards) (which include physical NIs 446), as well as non-transitory machine readable storage media 448 having stored therein software 450. During operation, the processor(s) 442 execute the software 450 to instantiate one or more sets of one or more applications 464A-R. While one embodiment does not implement virtualization, alternative embodiments may use different forms of virtualization—represented by a virtualization layer 454 and software containers 462A-R. For example, one such alternative embodiment implements operating system-level virtualization, in which case the virtualization layer 454 represents the kernel of an operating system (or a shim executing on a base operating system) that allows for the creation of multiple software containers 462A-R that may each be used to execute one of the sets of applications 464A-R. In this embodiment, the multiple software containers 462A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 454 represents a hypervisor (sometimes referred to as a virtual machine monitor (VMM)) or a hypervisor executing on top of a host operating system; and 2) the software containers 462A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 464A-R, as well as the virtualization layer 454 and software containers 462A-R if implemented, are collectively referred to as software instance(s) 452. Each set of applications 464A-R, corresponding software container 462A-R if implemented, and that part of the hardware 440 that executes them (be it hardware dedicated to that execution and/or time slices of hardware temporally shared by software containers 462A-R), forms a separate virtual network element(s) 460A-R.

The virtual network element(s) 460A-R perform similar functionality to the virtual network element(s) 430A-R—e.g., similar to the control communication and configuration module(s) 432A and forwarding table(s) 434A (this virtualization of the hardware 440 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 462A-R differently. For example, while embodiments of the invention are illustrated with each software container 462A-R corresponding to one VNE 460A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 462A-R to VNEs also apply to embodiments where such a finer level of granularity is used.

In certain embodiments, the virtualization layer 454 includes a virtual switch that provides similar forwarding services as a physical Ethernet switch. Specifically, this virtual switch forwards traffic between software containers 462A-R and the NIC(s) 444, as well as optionally between the software containers 462A-R; in addition, this virtual switch may enforce network isolation between the VNEs 460A-R that by policy are not permitted to communicate with each other (e.g., by honoring virtual local area networks (VLANs)).

Software 450 can include code which when executed by processor(s) 442, cause processor(s) 442 to perform operations of one or more embodiments of the present invention as part software containers 462A-R. This software can include the multicast management module 464A that performs the processes and implements the structures described herein above.

The third exemplary ND implementation in FIG. 4A is a hybrid network device 406, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 402) could provide for para-virtualization to the networking hardware present in the hybrid network device 406.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 430A-R, VNEs 460A-R, and those in the hybrid network device 406) receives data on the physical NIs (e.g., 416, 446) and forwards that data out the appropriate ones of the physical NIs (e.g., 416, 446). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

FIG. 4C illustrates various exemplary ways in which VNEs may be coupled according to some embodiments of the invention. FIG. 4C shows VNEs 470A.1-470A.P (and optionally VNEs 470A.Q-470A.R) implemented in ND 400A and VNE 470H.1 in ND 400H. In FIG. 4C, VNEs 470A.1-P are separate from each other in the sense that they can receive packets from outside ND 400A and forward packets outside of ND 400A; VNE 470A.1 is coupled with VNE 470H.1, and thus they communicate packets between their respective NDs; VNE 470A.2-470A.3 may optionally forward packets between themselves without forwarding them outside of the ND 400A; and VNE 470A.P may optionally be the first in a chain of VNEs that includes VNE 470A.Q followed by VNE 470A.R (this is sometimes referred to as dynamic service chaining, where each of the VNEs in the series of VNEs provides a different service—e.g., one or more layer 4-7 network services). While FIG. 4C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 4A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 4A may also host one or more such servers (e.g., in the case of the general purpose network device 404, one or more of the software containers 462A-R may operate as servers; the same would be true for the hybrid network device 406; in the case of the special-purpose network device 402, one or more such servers could also be run on a virtualization layer executed by the compute resource(s) 412); in which case the servers are said to be co-located with the VNEs of that ND.

A virtual network is a logical abstraction of a physical network (such as that in FIG. 4A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 4D illustrates a network with a single network element on each of the NDs of FIG. 4A, and within this straight forward approach contrasts a traditional distributed approach (commonly used by traditional routers) with a centralized approach for maintaining reachability and forwarding information (also called network control), according to some embodiments of the invention. Specifically, FIG. 4D illustrates network elements (NEs) 470A-H with the same connectivity as the NDs 400A-H of FIG. 4A.

FIG. 4D illustrates that the distributed approach 472 distributes responsibility for generating the reachability and forwarding information across the NEs 470A-H; in other words, the process of neighbor discovery and topology discovery is distributed.

For example, where the special-purpose network device 402 is used, the control communication and configuration module(s) 432A-R of the ND control plane 424 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP)), Label Distribution Protocol (LDP), Resource Reservation Protocol (RSVP), as well as RSVP-Traffic Engineering (TE): Extensions to RSVP for LSP Tunnels, Generalized Multi-Protocol Label Switching (GMPLS) Signaling RSVP-TE that communicate with other NEs to exchange routes, and then selects those routes based on one or more routing metrics. Thus, the NEs 470A-H (e.g., the compute resource(s) 412 executing the control communication and configuration module(s) 432A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 424. The ND control plane 424 programs the ND forwarding plane 426 with information (e.g., adjacency and route information) based on the routing structure(s). For example, the ND control plane 424 programs the adjacency and route information into one or more forwarding table(s) 434A-R (e.g., Forwarding Information Base (FIB), Label Forwarding Information Base (LFIB), and one or more adjacency structures) on the ND forwarding plane 426. For layer 2 forwarding, the ND can store one or more bridging tables that are used to forward data based on the layer 2 information in that data. While the above example uses the special-purpose network device 402, the same distributed approach 472 can be implemented on the general purpose network device 404 and the hybrid network device 406.

FIG. 4D illustrates that a centralized approach 474 (also known as software defined networking (SDN)) that decouples the system that makes decisions about where traffic is sent from the underlying systems that forwards traffic to the selected destination. The illustrated centralized approach 474 has the responsibility for the generation of reachability and forwarding information in a centralized control plane 476 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 476 has a south bound interface 482 with a data plane 480 (sometime referred to the infrastructure layer, network forwarding plane, or forwarding plane (which should not be confused with a ND forwarding plane)) that includes the NEs 470A-H (sometimes referred to as switches, forwarding elements, data plane elements, or nodes). The centralized control plane 476 includes a network controller 478, which includes a centralized reachability and forwarding information module 479 that determines the reachability within the network and distributes the forwarding information to the NEs 470A-H of the data plane 480 over the south bound interface 482 (which may use the OpenFlow protocol). Thus, the network intelligence is centralized in the centralized control plane 476 executing on electronic devices that are typically separate from the NDs.

For example, where the special-purpose network device 402 is used in the data plane 480, each of the control communication and configuration module(s) 432A-R of the ND control plane 424 typically include a control agent that provides the VNE side of the south bound interface 482. In this case, the ND control plane 424 (the compute resource(s) 412 executing the control communication and configuration module(s) 432A-R) performs its responsibility for participating in controlling how data (e.g., packets) is to be routed (e.g., the next hop for the data and the outgoing physical NI for that data) through the control agent communicating with the centralized control plane 476 to receive the forwarding information (and in some cases, the reachability information) from the centralized reachability and forwarding information module 479 (it should be understood that in some embodiments of the invention, the control communication and configuration module(s) 432A-R, in addition to communicating with the centralized control plane 476, may also play some role in determining reachability and/or calculating forwarding information—albeit less so than in the case of a distributed approach; such embodiments are generally considered to fall under the centralized approach 474, but may also be considered a hybrid approach).

While the above example uses the special-purpose network device 402, the same centralized approach 474 can be implemented with the general purpose network device 404 (e.g., each of the VNE 460A-R performs its responsibility for controlling how data (e.g., packets) is to be routed (e.g., the next hop for the data and the outgoing physical NI for that data) by communicating with the centralized control plane 476 to receive the forwarding information (and in some cases, the reachability information) from the centralized reachability and forwarding information module 479; it should be understood that in some embodiments of the invention, the VNEs 460A-R, in addition to communicating with the centralized control plane 476, may also play some role in determining reachability and/or calculating forwarding information—albeit less so than in the case of a distributed approach) and the hybrid network device 406. In fact, the use of SDN techniques can enhance the NFV techniques typically used in the general purpose network device 404 or hybrid network device 406 implementations as NFV is able to support SDN by providing an infrastructure upon which the SDN software can be run, and NFV and SDN both aim to make use of commodity server hardware and physical switches. In some embodiments, the functions described herein above for improving multicast efficiency with regards to reduced state may be implemented via multicast management module 481 or similarly implemented at the centralized control plane 476.

FIG. 4D also shows that the centralized control plane 476 has a north bound interface 484 to an application layer 486, in which resides application(s) 488. The centralized control plane 476 has the ability to form virtual networks 492 (sometimes referred to as a logical forwarding plane, network services, or overlay networks (with the NEs 470A-H of the data plane 480 being the underlay network)) for the application(s) 488. Thus, the centralized control plane 476 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 4D shows the distributed approach 472 separate from the centralized approach 474, the effort of network control may be distributed differently or the two combined in certain embodiments of the invention. For example: 1) embodiments may generally use the centralized approach (SDN) 474, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 474, but may also be considered a hybrid approach.

While FIG. 4D illustrates the simple case where each of the NDs 400A-H implements a single NE 470A-H, it should be understood that the network control approaches described with reference to FIG. 4D also work for networks where one or more of the NDs 400A-H implement multiple VNEs (e.g., VNEs 430A-R, VNEs 460A-R, those in the hybrid network device 406). Alternatively or in addition, the network controller 478 may also emulate the implementation of multiple VNEs in a single ND. Specifically, instead of (or in addition to) implementing multiple VNEs in a single ND, the network controller 478 may present the implementation of a VNE/NE in a single ND as multiple VNEs in the virtual networks 492 (all in the same one of the virtual network(s) 492, each in different ones of the virtual network(s) 492, or some combination). For example, the network controller 478 may cause an ND to implement a single VNE (a NE) in the underlay network, and then logically divide up the resources of that NE within the centralized control plane 476 to present different VNEs in the virtual network(s) 492 (where these different VNEs in the overlay networks are sharing the resources of the single VNE/NE implementation on the ND in the underlay network).

On the other hand, FIGS. 4E and 4F respectively illustrate exemplary abstractions of NEs and VNEs that the network controller 478 may present as part of different ones of the virtual networks 492. FIG. 4E illustrates the simple case of where each of the NDs 400A-H implements a single NE 470A-H (see FIG. 4D), but the centralized control plane 476 has abstracted multiple of the NEs in different NDs (the NEs 470A-C and G-H) into (to represent) a single NE 470I in one of the virtual network(s) 492 of FIG. 4D, according to some embodiments of the invention. FIG. 4E shows that in this virtual network, the NE 470I is coupled to NE 470D and 470F, which are both still coupled to NE 470E.

FIG. 4F illustrates a case where multiple VNEs (VNE 470A.1 and VNE 470H.1) are implemented on different NDs (ND 400A and ND 400H) and are coupled to each other, and where the centralized control plane 476 has abstracted these multiple VNEs such that they appear as a single VNE 470T within one of the virtual networks 492 of FIG. 4D, according to some embodiments of the invention. Thus, the abstraction of a NE or VNE can span multiple NDs.

While some embodiments of the invention implement the centralized control plane 476 as a single entity (e.g., a single instance of software running on a single electronic device), alternative embodiments may spread the functionality across multiple entities for redundancy and/or scalability purposes (e.g., multiple instances of software running on different electronic devices).

Figure 5:
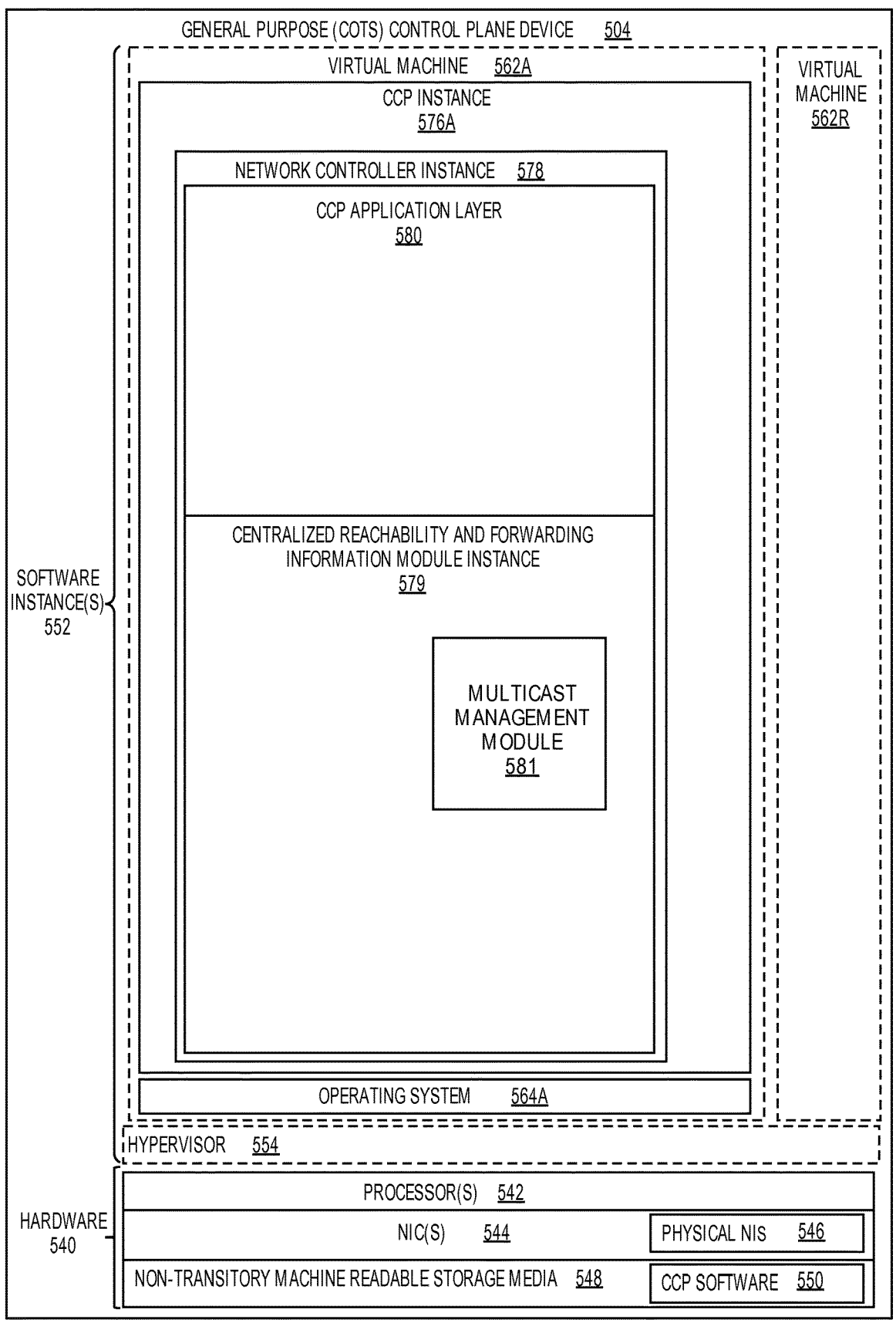
FIG. 5 illustrates a general purpose control plane device with centralized control plane (CCP) software, according to some embodiments of the invention.

Similar to the network device implementations, the electronic device(s) running the centralized control plane 476, and thus the network controller 478 including the centralized reachability and forwarding information module 479, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 5 illustrates, a general purpose control plane device 504 including hardware 540 comprising a set of one or more processor(s) 542 (which are often COTS processors) and network interface controller(s) 544 (NICs; also known as network interface cards) (which include physical NIs 546), as well as non-transitory machine readable storage media 548 having stored therein centralized control plane (CCP) software 550.

In embodiments that use compute virtualization, the processor(s) 542 typically execute software to instantiate a virtualization layer 554 and software container(s) 562A-R (e.g., with operating system-level virtualization, the virtualization layer 554 represents the kernel of an operating system (or a shim executing on a base operating system) that allows for the creation of multiple software containers 562A-R (representing separate user space instances and also called virtualization engines, virtual private servers, or jails) that may each be used to execute a set of one or more applications; with full virtualization, the virtualization layer 554 represents a hypervisor (sometimes referred to as a virtual machine monitor (VMM)) or a hypervisor executing on top of a host operating system, and the software containers 562A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 550 (illustrated as CCP instance 576A) is executed within the software container 562A on the virtualization layer 554. In embodiments where compute virtualization is not used, the CCP instance 576A on top of a host operating system is executed on the "bare metal" general purpose control plane device 504. The instantiation of the CCP instance 576A, as well as the virtualization layer 554 and software containers 562A-R if implemented, are collectively referred to as software instance(s) 552.

In some embodiments, the CCP instance 576A includes a network controller instance 578. The network controller instance 578 includes a centralized reachability and forwarding information module instance 579 (which is a middleware layer providing the context of the network controller 478 to the operating system and communicating with the various NEs), and an CCP application layer 580 (sometimes referred to as an application layer) over the middleware layer (providing the intelligence required for various network operations such as protocols, network situational awareness, and user—interfaces). At a more abstract level, this CCP application layer 580 within the centralized control plane 476 works with virtual network view(s) (logical view(s) of the network) and the middleware layer provides the conversion from the virtual networks to the physical view. In some embodiments the process for improved multicast state efficiency as described herein above is implemented at the control plane via the multicast management module 581 or similarly implemented via the control plane device 504.

The centralized control plane 476 transmits relevant messages to the data plane 480 based on CCP application layer 580 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 480 may receive different messages, and thus different forwarding information. The data plane 480 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 480, the packet (or a subset of the packet header and content) is typically forwarded to the centralized control plane 476. The centralized control plane 476 will then program forwarding table entries into the data plane 480 to accommodate packets belonging to the flow of the unknown packet. Once a specific forwarding table entry has been programmed into the data plane 480 by the centralized control plane 476, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method implemented by a network device in a network including a plurality of network devices, the method to implement multicast forwarding configuration where the method produces a reduced state for the network by utilizing unicast tunneling between a root, replication points and leaves that implement each multicast distribution tree, the method comprising:
   selecting, by the network device, a multicast group to determine forwarding configuration for the selected multicast group;

pruning all branches of a shortest path tree computed by the network device for all nodes in the network, the shortest path tree rooted at a source node for the selected multicast group, where the network device determines that the branches do not serve at least one leaf for the multicast group to generate a source group tree;

determining, by the network device, whether the network device is a root or a replication node for the source group tree;

checking whether a downstream leaf or replicating node is adjacent to the network device; and where a selected branch for which the network device is a replication node does not have an adjacent replication node or leaf, identifying a next replicating node or leaf on the selected branch, and configuring the network device, by the network device, to forward multicast group traffic to the identified next replicating node or leaf using a unicast tunnel.

2. The method of claim 1, further comprising:
configuring the network device to forward multicast group traffic using a multicast group identifier to the adjacent leaf or replicating node where the network device is a replication node.

3. The method of claim 1, further comprising:
checking whether the network device is a root for the source group tree; and
mapping multicast traffic for distribution in the network to a set of identifiers used to identify (S,G) traffic.

4. The method of claim 1, further comprising:
checking whether the network device is a replication node for the source group tree; and
configuring the network device to handle a multicast group identifier on an upstream interface and to cross connect an ingress multicast identifier with an egress multicast identifier.

5. The method of claim 1, wherein the method is initiated in response to a device startup, an update of a network topology or multicast group membership information.

6. A network device in a network including a plurality of network devices, the network device to execute a method to implement multicast forwarding configuration where the method produces a reduced state for the network by utilizing unicast tunneling between a root, replication points and leaves that implement each multicast distribution tree, the network device comprising:

a non-transitory machine-readable storage device having stored therein a multicast management module; and a processor coupled to the non-transitory machine-readable storage device, the processor configured to execute the multicast management module, the multicast management module configured to select a multicast group to determine forwarding configuration for the selected multicast group, prune all branches of a shortest path tree computed by the network device for all nodes in the network, the shortest path tree rooted at a source node for the selected multicast group, where the network device determines that the branches do not serve at least one leaf for the multicast group to generate a source group tree, to determine whether the network device is a root or a replication node for the source group tree, to check whether a downstream leaf or replicating node is adjacent to the network device, and where a selected branch for which the network device is a replication node does not have an adjacent replication node or leaf, identifying a next replicating node or leaf on the selected branch, and configuring the network device to forward multicast group traffic to the identified next replicating node or leaf using a unicast tunnel.

7. The network device of claim 6, wherein the processor is further configured to execute the multicast management module, the multicast management module to configure the network device to forward multicast group traffic using a multicast group identifier to the adjacent leaf or replicating node where the network device is a replication node.

8. The network device of claim 6, wherein the processor is further configured to execute the multicast management module, the multicast management module configured to check whether the network device is a root for the source group tree, and to map multicast traffic for distribution in the network to a set of identifiers used to identify (S,G) traffic.

9. The network device of claim 6, wherein the processor is further configured to execute the multicast management module, the multicast management module configured to check whether the network device is a replication node for the source group tree, and to configure the network device to handle a multicast group identifier on an upstream interface and to cross connect an ingress multicast identifier with an egress multicast identifier.

10. The network device of claim 6, wherein the method is initiated in response to a device startup, an update of a network topology or multicast group membership information.

11. A computing device in communication with a network device in a network with a plurality of network devices, the computing device to execute a plurality of virtual machines for implementing network function virtualization (NFV), wherein a virtual machine from the plurality of virtual machines is configured to implement multicast forwarding configuration utilizing a method to produce a reduced state for the network by utilizing unicast tunneling between a root, replication points and leaves that implement each multicast distribution tree, the computing device comprising:

a non-transitory machine-readable storage device having stored therein a multicast management module; and a processor coupled to the non-transitory machine-readable storage device, the processor configured to execute the virtual machine, the virtual machine configured to execute the multicast management module, the multicast management module configured to select a multicast group to determine forwarding configuration for the selected multicast group, prune all branches of a shortest path tree computed for the network device for all nodes in the network, the shortest path tree rooted at a source node for the selected multicast group, where it is determined that the branches do not serve at least one leaf for the multicast group to generate a source group tree, to determine whether the network device is a root or a replication node for the source group tree, to check whether a downstream leaf or replicating node is adjacent to the network device, and where a selected branch for which the network device is a replication node does not have an adjacent replication node or leaf, identifying a next replicating node or leaf on the selected branch, and configuring the network device to forward multicast group traffic to the identified next replicating node or leaf using a unicast tunnel.

12. The computing device of claim 11, wherein the processor is further configured to execute the multicast management module, the multicast management module to configure the network device to forward multicast group traffic using a multicast group identifier to the adjacent leaf or replicating node where the network device is a replication node.

13. The computing device of claim 11, wherein the processor is further configured to execute the multicast management module, the multicast management module configured to check whether the network device is a root for the source group tree, and to map multicast traffic for distribution in the network to a set of identifiers used to identify (S,G) traffic.

14. The computing device of claim 11, wherein the processor is further configured to execute the multicast management module, the multicast management module configured to check whether the network device is a replication node for the source group tree, and to configure the network device to handle a multicast group identifier on an upstream interface and to cross connect an ingress multicast identifier with an egress multicast identifier.

15. The computing device of claim 11, wherein the method is initiated in response to a device startup, an update of a network topology or multicast group membership information.

16. A control plane device is configured to implement a control plane of a software defined networking (SDN) network including a network device in a network with a plurality of network devices, wherein the control plane device is configured to implement multicast forwarding configuration utilizing a method to produce a reduced state for the network by utilizing unicast tunneling between a root, replication points and leaves that implement each multicast distribution tree, the control plane device comprising:
 a non-transitory machine-readable storage device having stored therein a multicast management module; and
 a processor coupled to the non-transitory machine-readable storage device, the processor configured to execute the multicast management module, the multicast management module configured to select a multicast group to determine forwarding configuration for the selected multicast group, prune all branches of a shortest path tree computed for the network device for all nodes in the network, the shortest path tree rooted at a source node for the selected multicast group, where it is determined that the branches do not serve at least one leaf for the multicast group to generate a source group tree, to determine whether the network device is a root or a replication node for the source group tree, to check whether a downstream leaf or replicating node is adjacent to the network device, and where a selected branch for which the network device is a replication node does not have an adjacent replication node or leaf, identifying a next replicating node or leaf on the selected branch, and configuring the network device to forward multicast group traffic to the identified next replicating node or leaf using a unicast tunnel.

17. The control plane device of claim 16, wherein the processor is further configured to execute the multicast management module, the multicast management module to configure the network device to forward multicast group traffic using a multicast group identifier to the adjacent leaf or replicating node where the network device is a replication node.

18. The control plane device of claim 16, wherein the processor is further configured to execute the multicast management module, the multicast management module configured to check whether the network device is a root for the source group tree, and to map multicast traffic for distribution in the network to a set of identifiers used to identify (S,G) traffic.

19. The control plane device of claim 16, wherein the processor is further configured to execute the multicast management module, the multicast management module configured to check whether the network device is a replication node for the source group tree, and to configure the network device to handle a multicast group identifier on an upstream interface and to cross connect an ingress multicast identifier with an egress multicast identifier.

20. The control plane device of claim 16, wherein the method is initiated in response to a device startup, an update of a network topology or multicast group membership information.

* * * * *